United States Patent
Okumura et al.

(10) Patent No.: US 6,847,592 B2
(45) Date of Patent: Jan. 25, 2005

(54) OPTICAL REPRODUCING DEVICE AND OPTICAL MEMORY MEDIUM

(75) Inventors: Tetsuya Okumura, Tenri (JP); Hiroshi Fuji, Seika-cho (JP)

(73) Assignee: Sharp Kabushiki Kaisha, Osaka (JP)

(*) Notice: Subject to any disclaimer, the term of this patent is extended or adjusted under 35 U.S.C. 154(b) by 617 days.

(21) Appl. No.: 09/909,291

(22) Filed: Jul. 19, 2001

(65) Prior Publication Data

US 2002/0126593 A1 Sep. 12, 2002

Related U.S. Application Data

(62) Division of application No. 09/103,869, filed on Jun. 24, 1998, now Pat. No. 6,288,992.

(30) Foreign Application Priority Data

Jun. 24, 1997 (JP) .............................................. 9-167009
Jul. 17, 1997 (JP) .............................................. 9-192361

(51) Int. Cl.⁷ .............................................. G11B 11/00
(52) U.S. Cl. .................. 369/13.54; 369/59.25
(58) Field of Search .......................... 369/13.27, 13.54, 369/13.26, 47.53, 59.11, 59.12, 59.25, 275.3, 275.4

(56) References Cited

U.S. PATENT DOCUMENTS

| | | | |
|---|---|---|---|
| 4,093,961 A | 6/1978 | Kanamaru | 358/128 |
| 5,477,528 A | 12/1995 | Murakami et al. | 369/275.4 |
| 5,537,381 A | 7/1996 | Fuji | 369/116 |
| 5,615,182 A | 3/1997 | Murakami et al. | 369/13 |
| 5,617,400 A | 4/1997 | Fuji | 369/116 |
| 5,684,769 A | 11/1997 | Kaneko | 369/47 |
| 5,699,342 A | 12/1997 | Yagi et al. | 369/116 |
| 5,796,704 A | 8/1998 | Nanba et al. | 369/116 |
| 5,887,010 A | 3/1999 | Arai | 372/38 |

FOREIGN PATENT DOCUMENTS

| | | | |
|---|---|---|---|
| JP | 61 53830 | 7/1986 | |
| JP | 4-337542 | 11/1992 | |
| JP | 06-204035 | 8/1994 | G11B/11/10 |
| JP | 6-243598 A | 9/1994 | |
| JP | 7-29238 | 1/1995 | |
| JP | 07 225952 | 8/1995 | |
| JP | 08 063817 | 3/1996 | |
| JP | 08 180420 | 7/1996 | |
| JP | 08 221760 | 8/1996 | |
| JP | 09-087030 | 4/1997 | G11B/11/10 |
| JP | 09-097625 | 4/1997 | G11B/11/10 |
| JP | 09 115165 | 5/1997 | |
| JP | 10 283686 | 10/1998 | |
| JP | 10 289500 | 10/1998 | |
| KR | 93-15767 | 7/1993 | |

OTHER PUBLICATIONS

H. Fuji et al., *proceedings of magneto–optical recording international symposium 1994*, J. Magn. Soc. Jpn., vol. 19, Supplement No. S1 (1995), pp. 441–442.

H. Fuji et al., in *Abstracts of papers of fifty–eighth Applied Physics Association Conference*, [Oct. 1997], 4a–ZE–10, pp. 1131 (with translation).

*Primary Examiner*—Thang V. Tran
(74) *Attorney, Agent, or Firm*—David G. Conlin; George W. Neuner; Edwards & Angell LLP

(57) ABSTRACT

An optical reproducing device according to the present invention detects mean amplitude values of short marks and long marks, which are recorded marks for reproducing power control, by means of a short mark level detecting circuit and a long mark level detecting circuit. Then a differential amplifier compares a ratio between these two mean amplitude values with a standard value, and outputs the result of this comparison. Thereafter, a reproducing power control circuit controls reproducing power of a semiconductor laser such that the absolute value of this comparison result is reduced. Since mean values of the amplitude values of the short marks and long marks are detected, the detection results are very accurate, and the precision of control of reproducing power can be greatly improved.

4 Claims, 27 Drawing Sheets

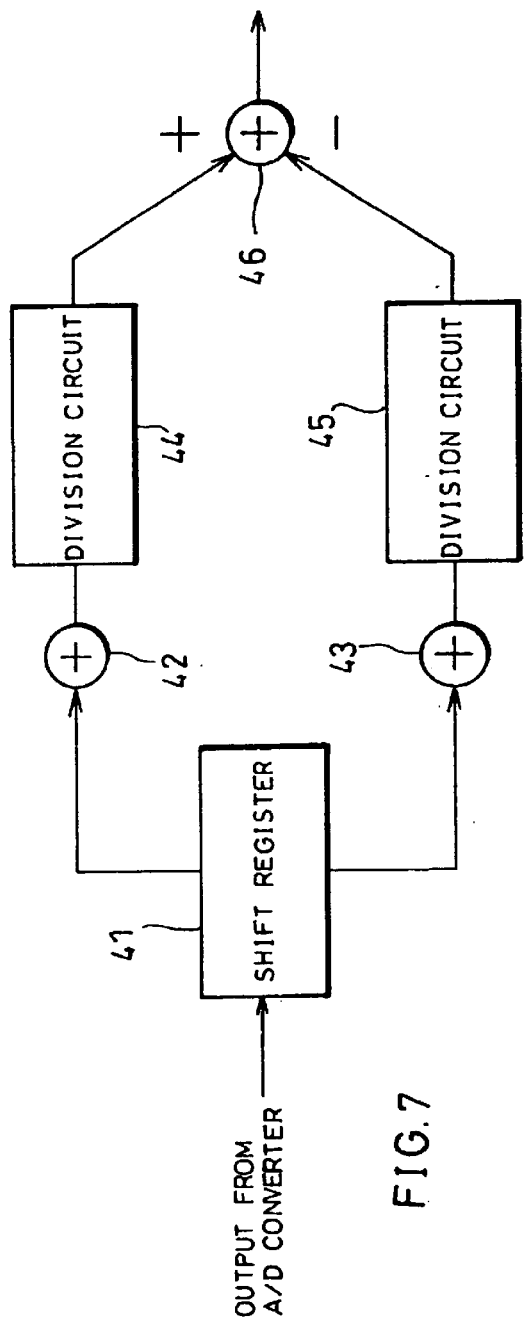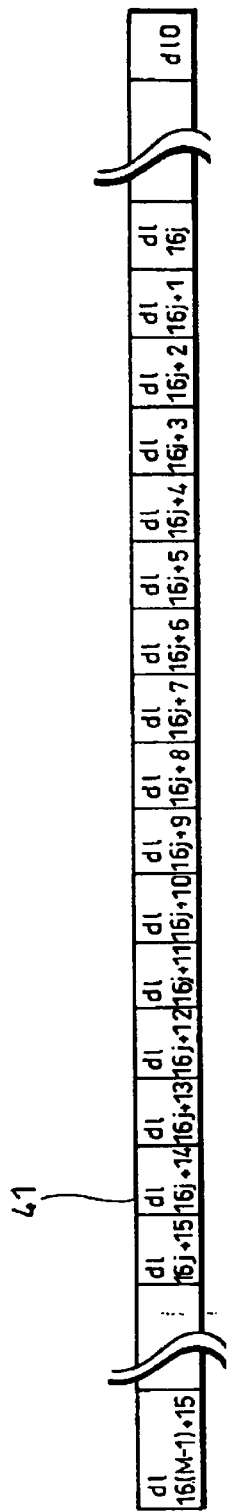
FIG.7
FIG.8

OPTICAL REPRODUCING DEVICE AND OPTICAL MEMORY MEDIUM

CROSS-REFERENCE TO RELATED APPLICATIONS

This application is a divisional application of U.S. Ser. No. 09/103,869 filed Jun. 24, 1998 now U.S. Pat. No. 6,288,992.

FIELD OF THE INVENTION

The present invention relates to an optical reproducing device and an optical memory medium, and in particular to an optical reproducing device which controls the quantity of light of a light beam projected onto an optical memory medium so as to bring close to a predetermined value the quantity of a reproducing signal from recorded marks recorded in the optical memory medium, and to an optical memory medium to be reproduced by this optical reproducing device.

BACKGROUND OF THE INVENTION

In magneto-optical disk devices which use the magnetic ultra high resolution method, a magneto-optical disk is used which is provided with a recording layer and with a reproducing layer having in-plane magnetization. In this type of magneto-optical disk device, during reproducing, a light beam is projected onto the reproducing layer side of the magneto-optical disk. Then, part of the area of the reproducing layer within the light beam spot is heated to above a predetermined temperature, and the magnetization of this portion (the aperture) shifts from in-plane magnetization to a perpendicular magnetization conforming to that of the recording layer beneath the aperture, i.e., the magnetization of the recording layer is copied to the reproducing layer. In this way, with this type of magneto-optical disk device, by reproducing the magnetization of the aperture, recorded marks smaller in diameter than the light beam spot can be reproduced.

In magneto-optical disk devices using this magnetic ultra high resolution method, it is preferable if the power of the light beam during reproducing (the reproducing power) is always at an optimum level. However, there are cases in which the optimum level of the reproducing power fluctuates with changes in the ambient temperature at the time of reproducing. For this reason, even if the current for driving the structure which produces the light beam (the driving current) is held constant, there are cases in which the reproducing power deviates from the optimum level.

If reproducing power is much stronger than the optimum level, the aperture formed on the magneto-optical disk becomes too large. Consequently, output of reproducing signals from tracks adjacent to the track being reproduced (crosstalk) is increased, the proportion of noise signals included in the reproduced data increases, and reading errors are more likely to occur.

Again, if reproducing power is much weaker than the optimum level, the aperture becomes smaller than the recorded mark, and the reproducing signal output from the target track is reduced. Accordingly, reading errors are more likely to occur in this case as well.

In a recording and reproducing device disclosed in Japanese Unexamined Patent Publication No. 8-63817/1996 (U.S. Pat. No. 5,617,400), in order to control reproducing power, long marks and short marks formed on a magneto-optical disk are reproduced. These long and short marks are two types of recorded marks for reproducing power control of different mark lengths. In this device, reproducing power is controlled so as to bring close to a predetermined value a ratio of the quantities of the reproducing signals from these recorded marks. By this means, in this device, reproducing power is maintained at an optimum value, and the likelihood of reading errors is reduced.

FIG. 30 is an explanatory drawing showing the general structure of this device. In this device, a light beam is projected from a semiconductor laser 108 onto a magneto-optical disk 112. Then, reflected light from marks for reproducing power control, which include long and short marks, is converted into a reproducing signal by a photodiode 113, and this reproducing signal is sent to an A/D (Analog/Digital) converter 115 and to a clock producing circuit 114. By means of the PLL (Phase Locked Loop) control method, the clock producing circuit 104 produces a clock signal synchronized with the reproducing signal, and sends this clock signal to the A/D converter 115.

Then, in accordance with the clock signal, the A/D converter 115 converts the reproducing signal into digital signals, which are sent to an amplitude ratio detecting circuit 116. The amplitude ratio detecting circuit 116 extracts, from the digital signals inputted for each clock signal, only the digital signals corresponding to upper and lower peak points. Then the amplitude ratio detecting circuit 116, based on the extracted digital signals, calculates the values of these upper and lower peak points and finds amplitude values for the long and short marks. Then a ratio between these amplitudes (amplitude ratio) is calculated and sent to a differential amplifier 110. This amplitude ratio corresponds with the size of the aperture on the reproducing layer of the magneto-optical disk.

The differential amplifier 110 compares the amplitude ratio with a predetermined standard value, and sends the results of this comparison to a reproducing power control circuit 111. The reproducing power control circuit 111 then controls driving current supplied to the semiconductor laser 108 in such a way that feedback reduces the difference between the amplitude ratio and the standard value.

In this way, the driving current supplied to the semiconductor laser 108 is controlled in such a manner that the light beam is always projected onto the magneto-optical disk at optimum reproducing power.

However, with this recording and reproducing device, the amplitude values of the recorded marks for reproducing power control are calculated using the values of only one upper peak point and one lower peak point. For this reason, the amplitude ratio calculated from these amplitude values is not sufficiently accurate, and thus there is a large error in control of reproducing power in this recording and reproducing device.

Again, as a method of reducing reading error rate with data recorded at high density, the PRML (Partial Response Maximum Likelihood) demodulating method has been proposed. The PRML demodulating method is a demodulating method in which a reproducing signal undergoes partial response equalization, and then maximum likelihood decoding (ML decoding) using Viterbi decoding.

A reproducing device using this demodulating-method is disclosed, for example, in Japanese Unexamined Patent Publication No. 6-243598/1994. In this device, a reproducing signal from an optical disk is equalized into PR(1,2,1) characteristics, and decoded into the most likely data by means of Viterbi decoding. FIG. 31 is an explanatory drawing showing the general structure of this device.

In reproducing using this device, an optical head 121 reads data recorded in an optical disk 120, and outputs an analog signal corresponding to this data. Then an A/D (Analog/Digital) converter 123 converts the analog signal into digital signals. The digital signals outputted by the A/D converter 123 are sent to a PRML demodulating circuit 126.

The PRML demodulating circuit 126 includes a PR equalizer 124 and a Viterbi decoder 125. The digital signals are equalized into PR(1,2,1) characteristics by the PR equalizer 124, and then Viterbi decoded by the Viterbi decoder 125, which outputs binarized data.

The analog signal outputted by the optical head 121 is also sent to a clock extracting section 122. The clock extracting section 122 produces and outputs to the A/D converter 123 clock signals with a bit cycle synchronized with the analog signal. The A/D converter 123 converts the analog signal to digital signals in accordance with the timing of the clock signal.

However, drawbacks of this reproducing device include the following. Namely, in this reproducing device, the sampling timing which is preferable for data reproducing, which is determined by the combination of the modulation method of the data recorded in the optical disk 120 and the demodulation method used by the PRML demodulating circuit 126, may not conform to the sampling timing which is preferable for accurately detecting the quantity of the reproducing signal of the recorded marks for reproducing power control.

Consider reproducing power when using PR(1,2,1)ML demodulating in the PRML demodulating circuit 126 to decode data from an optical disk recorded, for example, by the (1,7)RLL (Run Length Limited) modulation method.

FIG. 32 is an explanatory drawing showing, for this structure, the timing of A/D conversion (sampling) suited to PR(1,2,1)ML demodulating for a reproducing signal consisting of a pattern of repeated shortest marks (mark length 2Tc). As shown in FIG. 32, with sampling suited to PR(1,2,1)ML demodulating, a point at the shoulder of the reproducing signal is sampled.

On the other hand, the mark length of the short marks used for reproducing power control is typically 2Tc. Further, when reproducing these short marks, it is preferable to sample the upper and lower peak points of the reproducing signal obtained. However, as shown in FIG. 32, in sampling with this structure, a point at the shoulder of a reproducing signal corresponding to recorded marks 2Tc in length is sampled. Accordingly, it is not preferable to use the reproducing signal quantity obtained by this sampling for reproducing power control. Accordingly, a drawback of this structure is that, if A/D conversion is performed with a timing suited to PR(1,2,1)ML demodulating, it is difficult to perform reproducing power control.

In this example, a combination of PR(1,2,1)ML demodulating and (1,7)RLL modulation was considered, but for data reproduced by other combinations, too, such as PR(1,1)ML demodulating and the EFM (Eight to Fourteen Modulation) modulation method, there is a sampling timing preferable for the combination used.

In this way, conventional structures have the problem that, when the optimum sampling timing for data reproducing (which is determined by the combination of the PRML demodulating method and the modulation method) does not conform with the optimum sampling timing for reproducing power control, accurate reproducing is difficult.

SUMMARY OF THE INVENTION

The first object of the present invention is to provide an optical reproducing device capable of precisely calculating the quantity of a reproducing signal obtained from an optical memory medium, and, based on the amplitude value of that reproducing signal quantity, precisely controlling reproducing power, and to provide an optical memory medium to be reproduced by this optical reproducing device.

Further, the second object of the present invention is to provide an optical reproducing device capable of performing reproducing power control and digital data reproducing using optimum clock signals.

In order to attain the first object mentioned above, an optical reproducing device according to the present invention is made up of a reproducing signal production section, which projects a light beam onto an optical memory medium, and, based on reflected light of the light beam, produces a reproducing signal corresponding to recorded marks recorded in the optical memory medium; a control signal output section, which detects a mean value of a signal quantity of the reproducing signal produced by the reproducing signal production section, and produces a first control signal corresponding to the mean value; and a reproducing power control section, which, based on the first control signal produced by the control signal output section, controls reproducing power of the light beam projected by the reproducing signal production section such that the signal quantity of the reproducing signal is a predetermined value.

In the foregoing structure, the reproducing signal production section projects a light beam onto the optical memory medium, and produces a reproducing signal corresponding to recorded marks recorded in the optical memory medium. The quantity of this reproducing signal corresponds with the reproducing power of the light beam projected onto the optical memory medium.

Then the control signal output section calculates a mean value of an amplitude of the reproducing signal, and, based on this mean value, produces a first control signal. The first control signal is produced on the basis of the mean of the amplitude value, and thus corresponds with the quantity of the reproducing signal from the optical memory medium.

Then the reproducing power control section, based on the first control signal, controls the reproducing power of the light beam projected onto the optical memory medium by the reproducing signal production section. In other words, the reproducing power control section judges the quantity of the current reproducing signal from the first control signal, and controls the reproducing power of the light beam projected onto the optical memory medium by the reproducing signal production section in such a manner that the quantity of the reproducing signal is a predetermined value.

In this way, the foregoing structure can always maintain a reproducing power capable of producing a reproducing signal of a predetermined signal quantity. Consequently, the frequency of reading errors such as crosstalk can be reduced, and stable reproducing is enabled.

Further, in the foregoing structure, the control signal output section detects a mean value of the reproducing signal quantity, and produces the first control signal on the basis of this mean value. Accordingly, the first control signal reflects the actual value of the reproducing signal quantity with great accuracy. Accordingly, the reproducing power control section is enabled to control the reproducing power of the reproducing signal production section with great accuracy.

Incidentally, the predetermined signal quantity referred to above is, for example, the optimum signal quantity for reproducing in the present optical reproducing device.

Further, "signal quantity" is, for example, the amplitude value of the reproducing signal.

Further, in order to attain the second object mentioned above, another optical reproducing device according to the present invention is made up of a reproducing signal production section, which projects a light beam onto an optical memory medium, and, based on reflected light of the light beam, produces a reproducing signal corresponding to recorded marks recorded in the optical memory medium; a digital signal output section, which outputs digital signals corresponding to the reproducing signal; a demodulation section, which demodulates the digital signals; and a reproducing power control section, which, based on the digital signals, controls reproducing power of the reproducing signal production section; in which the digital signal output section, is made up of a clock signal output section, which outputs a clock signal in accordance with the modulation method of the recorded marks, the demodulation method of the demodulation section, and the control method of the reproducing power control section; and a digital signal producing section, which, based on the clock signal outputted by the clock signal output section, samples the reproducing signal and produces digital signals.

In the foregoing structure, the reproducing signal production section projects a light beam onto the optical memory medium, and produces a reproducing signal according to recorded marks recorded in the optical memory medium.

Further, the digital signal output section includes a clock signal output section, which produces a clock signal based on the reproducing signal. This clock signal is a clock signal which is in accordance with the modulation method of the recorded marks, the demodulation method of the demodulation section, and the control method of the reproducing power control section. Then the digital signal producing section, based on the clock signal, produces digital signals corresponding to the reproducing signal.

Typically, the timing of sampling for production of digital signals suitable for demodulating by a demodulation section is determined by the modulation method of the recorded marks and the demodulation method of the demodulation section. Further, the timing of sampling for production of digital signals suitable for reproducing power control is determined by the modulation method of the recorded marks and the control method of the reproducing power control section. In addition, the timing of sampling is determined by a clock signal.

For these reasons, the clock signal output section, giving consideration to the foregoing modulation method, demodulation, and control method, produces a clock signal capable of producing both of the foregoing digital signals. This clock signal may be two different clock signals, or it may be a single clock signal capable of producing both of the foregoing digital signals.

Next, the digital signal producing section, based on the clock signal outputted by the clock signal output section, produces the digital signals for outputting to the demodulation section and the digital signals for outputting to the reproducing power control section, and outputs these digital signals to the demodulation section and the reproducing power control section, respectively.

Accordingly, with the foregoing structure, even if the timing of sampling for producing the digital signals for demodulation differs from the timing of sampling for producing the digital signals suited to reproducing power control, it is possible to perform accurate reproducing power control and demodulation with a low error rate.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 7 is an explanatory drawing showing the structure of a long mark level detecting circuit in the optical reproducing device shown in FIG. 1.

FIG. 8 is an explanatory drawing showing the structure of a shift register in the long mark level detecting circuit shown in FIG. 7.

DESCRIPTION OF THE EMBODIMENTS

[First Embodiment]

The first embodiment of the present invention will be explained below.

Figure 1:
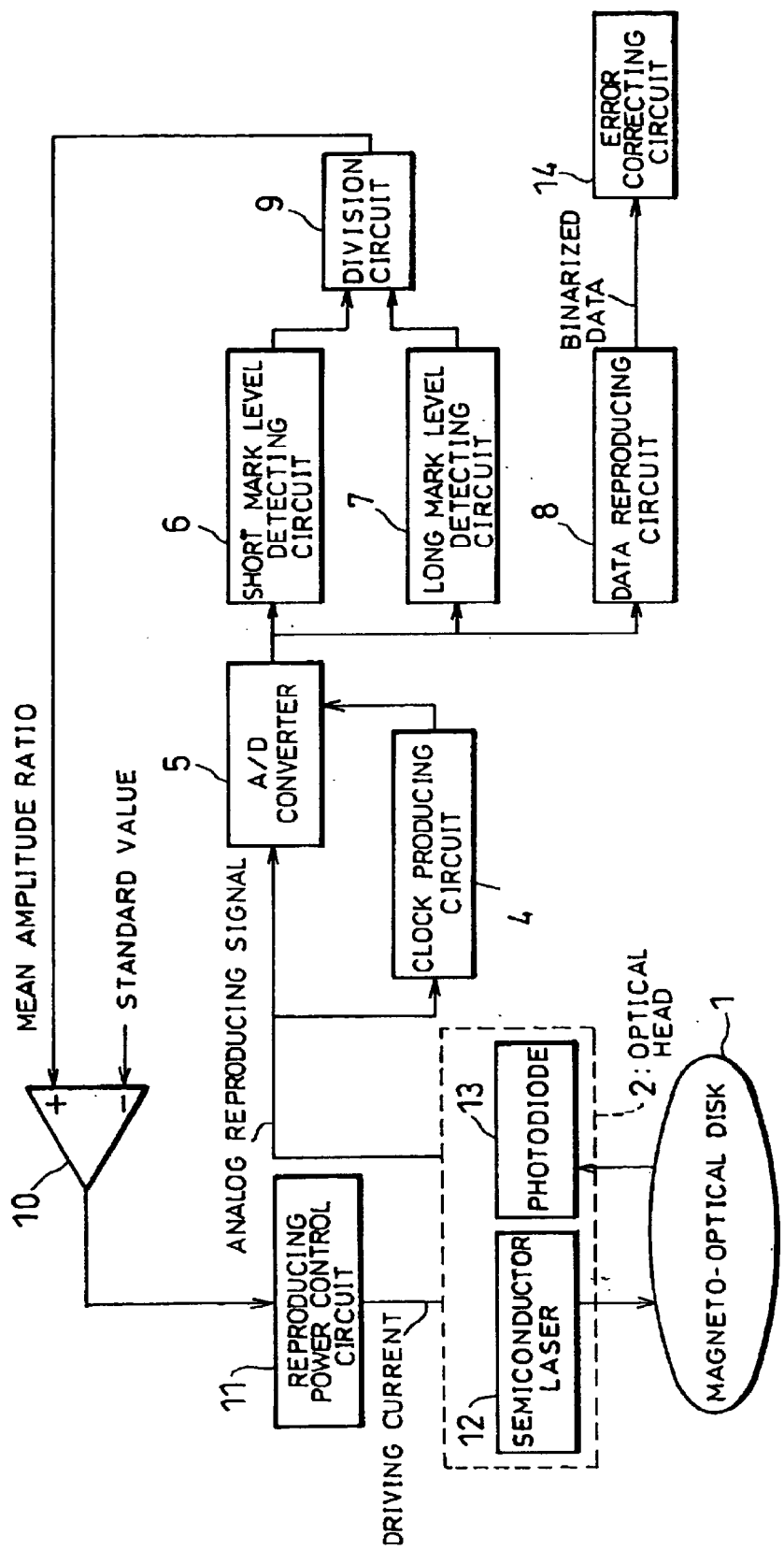
FIG. 1 is an explanatory drawing showing the structure of a magnetic ultra high resolution optical reproducing device according to the first embodiment of the present invention.

FIG. 1 is an explanatory drawing showing the structure of a magnetic ultra high resolution optical reproducing device (hereinafter referred to as "the present reproducing device"). As shown in the Figure, the present reproducing device is made up of an optical head 2, a clock producing circuit 4, an A/D converter 5, a short mark level detecting circuit 6, a long mark level detecting circuit 7, a data reproducing circuit 8, a division circuit 9, a differential amplifier 10, a reproducing power control circuit 11, and an error correcting circuit 14. Further, the magneto-optical disk 1 shown in FIG. 1 is an optical memory medium to be reproduced by the present reproducing device.

Figure 2:
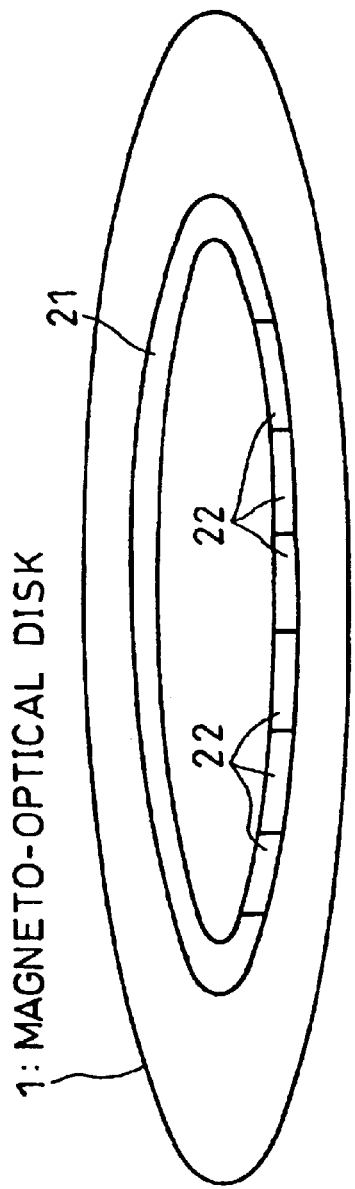
FIG. 2 is an explanatory drawing showing the structure of a magneto-optical disk for reproducing by the optical reproducing device shown in FIG. 1.

Prior to explaining the structure of the present reproducing device, the structure of the magneto-optical disk 1 will first be explained. In the magneto-optical disk 1 various data is recorded by (1,7)RLL (Run Length Limited) modulation. FIG. 2 is an explanatory drawing showing the structure of the magneto-optical disk 1. As shown in the Figure, a recording track 21 is formed in the shape of a circular band concentric with the circular magneto-optical disk 1. Further, in the recording track 21 are successively formed a plurality of sectors 22.

Figure 3:
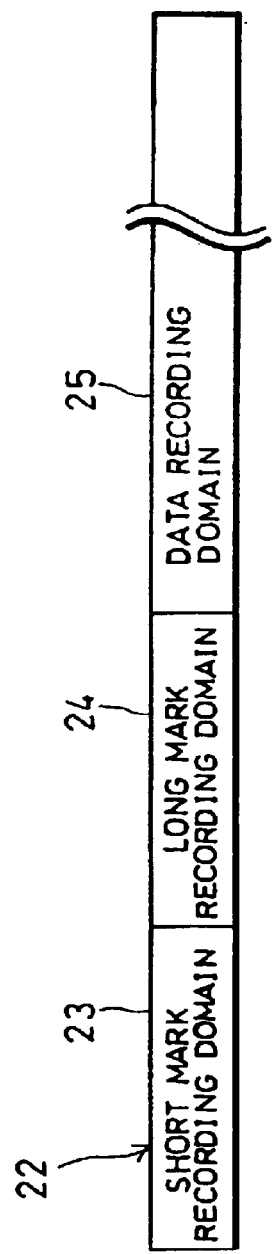
FIG. 3 is an explanatory drawing showing the structure of sectors formed in the magneto-optical disk shown in FIG. 2.

FIG. 3 is an explanatory drawing showing the structure of a sector 22. As shown in the Figure, in each sector 22 are formed a short mark recording domain 23, a long mark recording domain 24, and a data recording domain 25.

The short mark recording domains 23 (reproducing power control domains) are domains in which are formed short marks, which are marks for reproducing power control. The long mark recording domains 24 (reproducing power control domains) are domains in which are formed long marks, which are also marks for reproducing power control. The data recording domains 25 are domains in which the user's desired data, modulated by (1,7)RLL, is recorded as digital data.

Figure 4:
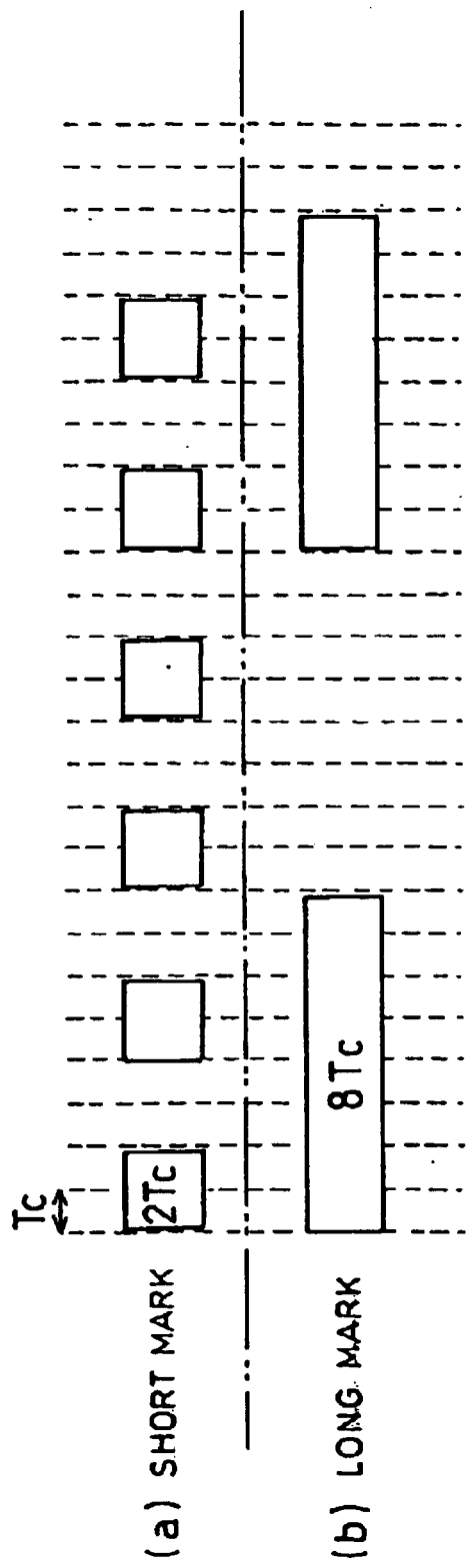
FIG. 4 is an explanatory drawing showing short marks and long marks formed in the magneto-optical disk shown in FIG. 2.

FIG. 4 is an explanatory drawing showing the short marks and the long marks, at (a) and (b), respectively. As shown in the Figure, in the short mark recording domain 23, short marks having a mark length of 2Tc (Tc being the length of a channel bit) are successively formed at an interval of 2Tc. In the same way, in the long mark recording domain 24, long marks having a mark length of 8Tc are successively formed at a mark interval of 8Tc. In what follows, the number of short marks and long marks formed in the short mark recording domain 23 and the long mark recording domain 24 will be N marks and M marks, respectively (N and M being predetermined natural numbers).

The following will explain each of the structures of the present reproducing device, shown in FIG. 1.

The optical head 2 includes a semiconductor laser 12 and a photodiode 13. The semiconductor laser 12 (reproducing signal production section; light beam projecting section) projects a light beam onto the recording track 21 of the magneto-optical disk 1 at a predetermined reproducing power. The photodiode 13 (reproducing signal production section; light receiving section) receives light reflected from each of the domains 23 through 25 of the sector 22, and produces and outputs an analog reproducing signal corresponding to this reflected light.

In what follows, this analog reproducing signal obtained from the magneto-optical disk 1 will be referred to as the "analog reproducing signal."

The clock producing circuit 4 (control signal output section), by means of PLL (Phase Locked Loop), produces a clock signal synchronized with the channel bit frequency of the analog reproducing signal, and outputs this clock signal to the A/D converter 5.

The A/D converter 5 (control signal output section; amplitude value detecting section) receives the analog reproducing signal and the clock signal, samples the analog reproducing signal on the basis of the clock signal, and produces digital signals corresponding to the value of the analog reproducing signal at each sampling point. The A/D converter 5 then sends these digital signals to the short mark level detecting circuit 6, the long mark level detecting circuit 7, and the data reproducing circuit 8. In what follows, the digital signals corresponding to each sampling point will be referred to as the "digital reproducing signals." Sampling of the analog reproducing signal by the A/D converter 5 will be discussed later.

Based on the digital reproducing signals received from the A/D converter 5, the short mark level detecting circuit 6 (control signal output section; mean value producing section; first mean value calculating section) calculates a mean value of all of the maximal values of the analog reproducing signal obtained from the entirety of a single short mark recording domain 23, and calculates a mean value of all of the minimal values of the same analog reproducing signal. Then, on the basis of these two mean values, the short mark level detecting circuit 6 calculates a mean amplitude value for the analog reproducing signal obtained from that single short mark recording domain 23 (short mark mean amplitude value).

Figure 5:
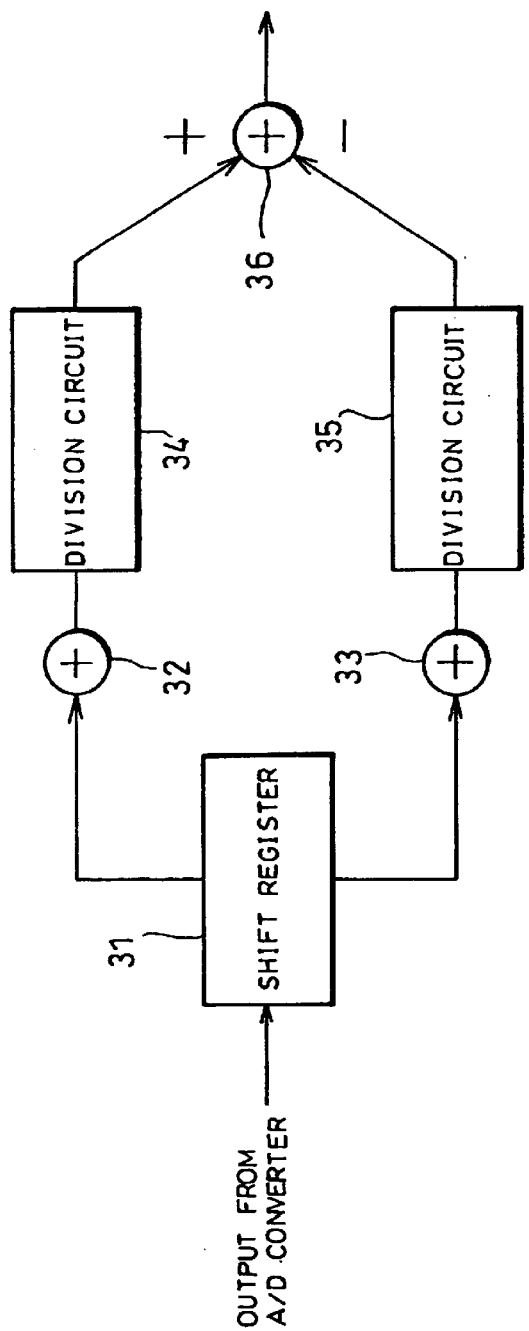
FIG. 5 is an explanatory drawing showing the structure of a short mark level detecting circuit in the optical reproducing device shown in FIG. 1.

FIG. 5 is an explanatory drawing showing the structure of the short mark level detecting circuit 6. As shown in the Figure, the short mark level detecting circuit 6 is made up of a shift register 31, addition circuits 32 and 33, division circuits 34 and 35, and a subtraction circuit 36.

Figure 6:
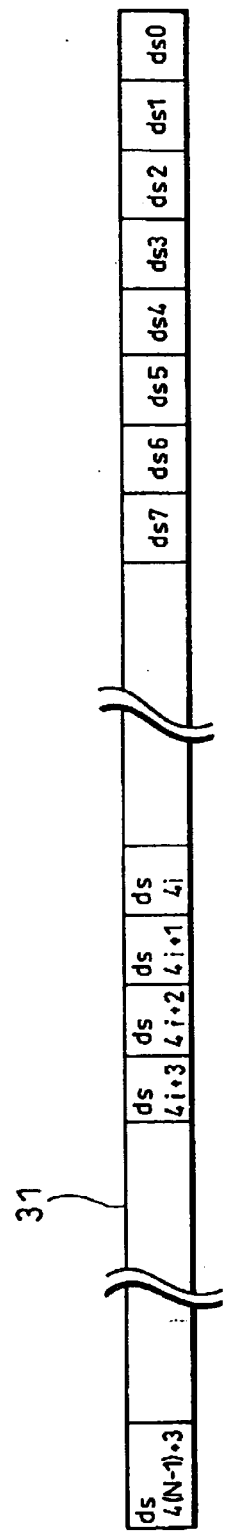
FIG. 6 is an explanatory drawing showing the structure of a shift register in the short mark level detecting circuit shown in FIG. 5.

The shift register 31 is a shift register of 4N stages. FIG. 6 is an explanatory drawing showing the structure of the shift register 31. As shown in the Figure, the shift register 31 is made up of 4N cells, including cells $ds_0$ through $ds_{4(N-1)+3}$. The shift register 31 stores the values of the digital reproducing signals obtained from the single short mark recording domain 23 and sent from the A/D converter 5 for each clock signal outputted by the clock producing circuit 4, in order, in cells $ds_0$ through $ds_{4(N-1)+3}$.

The addition circuits 32 and 33 add the digital reproducing signal values stored in predetermined cells of the shift register 31, and output the total values obtained thereby. The division circuits 34 and 35 divide by N the total values received from the addition circuits 32 and 33, respectively, and send the respective divided values to the subtraction circuit 36. In the subtraction circuit 36, the divided value received from the division circuit 35 is subtracted from the divided value received from the division circuit 34, and the resulting value is sent to the division circuit 9 shown in FIG. 1.

Calculation of the short mark mean amplitude value by the short mark level detecting circuit 6 will be discussed later.

The long mark level detecting circuit 7 (control signal output section; mean value producing section; second mean value calculating section), based on the digital reproducing signals received from the A/D converter 5, calculates a mean value of all of the maximal values of the analog reproducing signal obtained from the entirety of a single long mark recording domain 24, and calculates a mean value of all of the minimal values of the same analog reproducing signal. Then, on the basis of these two mean values, the long mark level detecting circuit 7 calculates a mean amplitude value for the analog reproducing signal obtained from that single long mark recording domain 24 (long mark mean amplitude value).

FIG. 7 is an explanatory drawing showing the structure of the long mark level detecting circuit 7. As shown in the Figure, the long mark level detecting circuit 7 is made up of a shift register 41, addition circuits 42 and 43, division circuits 44 and 45, and a subtraction circuit 46.

The shift register 41 is a shift register of 16M stages. FIG. 8 is an explanatory drawing showing the structure of the shift register 41. As shown in the Figure, the shift register 41 is made up of 16M cells, including cells $dl_0$ through $dl_{16(M-1)+15}$. The shift register 41 stores the values of the digital reproducing signals obtained from the single long mark recording domain 24 and sent from the A/D converter 5 for each clock signal outputted by the clock producing circuit 4, in order, in cells $dl_0$ through $dl_{16(M-1)+15}$.

The addition circuits 42 and 43 add the digital reproducing signal values stored in predetermined cells of the shift register 41, and output the total values obtained thereby. The division circuits 44 and 45 divide by 4M the total values received from the addition circuits 42 and 43, respectively, and send the respective divided values to the subtraction circuit 46. In the subtraction circuit 46, the divided value received from the division circuit 45 is subtracted from the divided value received from the division circuit 44, and the resulting value is sent to the division circuit 9 shown in FIG. 1.

Calculation of the long mark mean amplitude value by the long mark level detecting circuit 7 will be discussed later.

The data reproducing circuit 8 (binarized data producing section) detects the level of, among the digital reproducing signals received from the A/D converter 5, the signal obtained from the light reflected from the data reproducing domain 25. In other words, the data reproducing circuit 8 produces binarized data corresponding to, among the digital reproducing signals received from the A/D converter 5, the signal obtained from the data recording domain 25.

The division circuit 9 (control signal output section; control signal producing section) receives the short mark mean amplitude value and the long mark mean amplitude value sent from the short mark level detecting circuit 6 and the long mark level detecting circuit 7, respectively, and calculates an outputs a ratio between these two mean amplitude values (mean amplitude ratio; first control signal).

The differential amplifier 10 (reproducing power control section) compares the mean amplitude ratio received from the division circuit 9 with a standard value received from a standard value producing circuit(not shown), and outputs the result of this comparison (the difference of the mean amplitude ratio and the standard value; second control signal). The mean amplitude ratio is in accordance with the signal quantity of the analog reproducing signal, i.e., with the size of the aperture in the reproducing layer of the magneto-optical disk 1.

The standard value is, for example, the value of a mean amplitude ratio detected when the present reproducing device performs reproducing at a reproducing power with which the bit error rate is minimized, i.e., the optimum reproducing power. Alternatively, the standard value may be a median value of a preferable range for the mean amplitude ratio. In the present reproducing device, a standard value of this kind is measured in advance, and stored in a memory device (not shown).

The reproducing power control circuit 11 (reproducing power control section; reproducing power adjusting section) supplies driving current to the semiconductor laser 12, and, by controlling the amperage of the driving current, controls the reproducing power of the semiconductor laser 12. The reproducing power control circuit 11 receives the result of comparison from the differential amplifier 10, and controls the driving current supplied to the semiconductor laser 12 so as to reduce the absolute value of this comparison result.

The error correcting circuit 14 (error correcting section) is a circuit for correcting errors in the binarized data outputted by the data reproducing circuit 8. The error correcting circuit 14 is capable of correcting errors in the binarized data with certainty when the bit error rate (BER) thereof is 1E-4 ($1 \times 10^{-4}$) or less.

The following will explain the operations of the present reproducing device when reproducing the magneto-optical disk 1.

During reproducing, reproducing begins with the short mark recording domain 23 of the sector 22. In other words, the light beam projected by the semiconductor laser 12 is first projected, at a predetermined initial reproducing power, onto the short mark recording domain 23. This initial reproducing power is as follows. When the reproducing power control circuit 11 is not receiving a feedback signal from the differential amplifier 10, the reproducing power control circuit 11 supplies a previously set initial driving current to the semiconductor laser 12. In other words, the initial reproducing power of the semiconductor laser 12 is a reproducing power obtained in accordance with the initial driving current.

Light reflected from the short mark recording domain 23 is received by the photodiode 13, which produces an analog reproducing signal, which is sent to the clock producing circuit 4 and the A/D converter 5. The clock producing circuit 5 produces and outputs to the A/D converter 5 a clock signal synchronized with the channel bit frequency of the analog reproducing signal.

Figure 9:
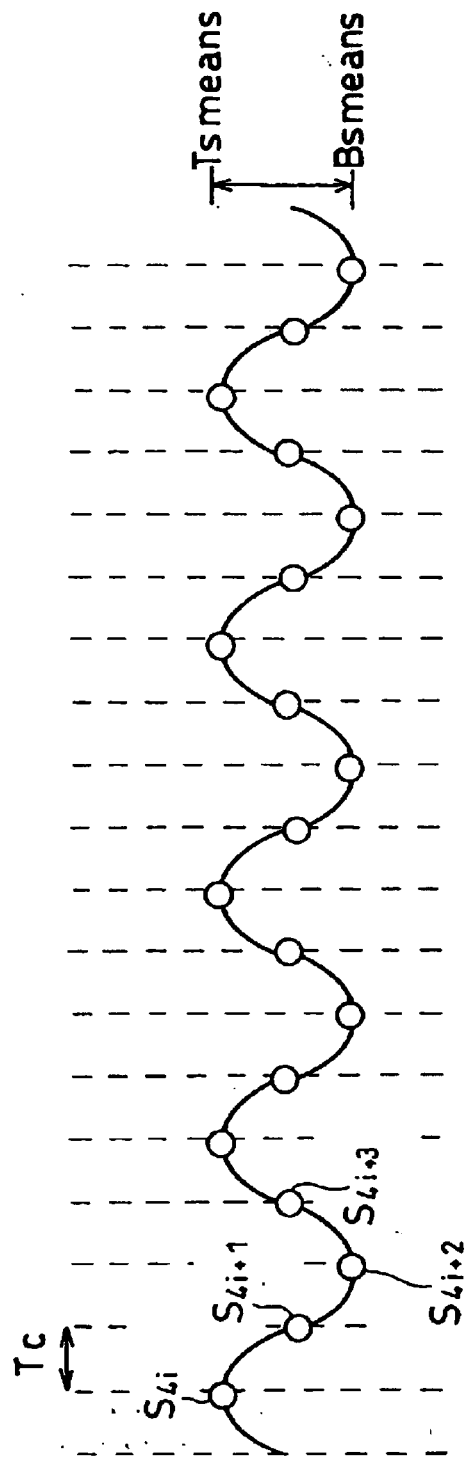
FIG. 9 is an explanatory drawing showing sampling by an A/D converter of an analog reproducing signal obtained from a short mark recording domain of the magneto-optical disk shown in FIG. 2.

In accordance with the timing of the clock signal outputted by the clock producing circuit 4, the A/D converter 5 produces digital reproducing signals from the analog reproducing signal, and outputs the digital reproducing signals to the short mark level detecting circuit 6. FIG. 9 is an explanatory drawing showing sampling by the A/D converter 5 of an analog reproducing signal obtained from the short mark recording domain 23. In the Figure, sampling points are indicated by "○."

As shown in FIG. 9, the sampling points sampled by the A/D converter 5 are of four types: an upper peak of the analog reproducing signal, a lower peak, and two points intermediate between these peaks. In what follows, as shown in the Figure, the upper peak point of the analog reproducing signal will be indicated as sampling point $s_{4i}$, the intermediate point passed when traveling from the upper peak point to the lower peak point as sampling point $s_{4i+1}$, the lower peak point as sampling point $s_{4i+2}$, and the intermediate point passed when traveling from the lower peak point to the upper peak point as sampling point $s_{4i+3}$. Here, i=0, 1, ..., N−1.

The A/D converter 5 converts the value of the analog reproducing signal at each of these sampling points to a digital reproducing signal, and successively outputs each of these digital reproducing signals. In other words, for every four sampling points, an upper peak point, a lower peak point, and two intermediate points of the analog reproducing signal are outputted.

Upon receiving the digital reproducing signals outputted by the A/D converter 5, the short mark level detecting circuit 6 stores these digital reproducing signals in the shift register 31 as follows. Namely, digital reproducing signals for the sampling points $s_0$ through $s_{4(N-1)+3}$ are stored in order in the cells $ds_0$ through $ds_{4(N-1)+3}$, 4N in number, of the shift register 31 (shown in FIG. 6). In other words, the digital reproducing signals for the sampling points $s_{4i}$, $s_{4i+1}$, $s_{4i+2}$, and $s_{4i+3}$ (i=0, 1, ..., (N−1)) are stored in the cells $ds_{4i}$, $ds_{4i+1}$, $ds_{4i+2}$, and $ds_{4i+3}$, respectively. The digital reproducing signal stored in each cell is held until reproducing of the short mark recording domain 23 is completed.

When reproducing of the short mark recording domain 23 is complete, the shift register 31 sends all of the digital reproducing signal values for the sampling points $s_{4i}$ (which are stored in the cells $ds_{4i}$), i.e., the values of the upper peak points of the analog reproducing signal, to the addition circuit 32. Again, the shift register 31 sends all of the digital reproducing signal values for the sampling points $s_{4i+2}$ (which are stored in the cells $ds_{4i+2}$), i.e., the values of the lower peak points of the analog reproducing signal, to the addition circuit 33.

The addition circuit 32 adds all of the digital reproducing signal values for the sampling points $s_{4i}$, and sends the total obtained to the division circuit 34. Again, the addition circuit 33 adds all of the digital reproducing signal values for the sampling points $s_{4i+2}$, and sends the total obtained to the division circuit 35.

The division circuit 34 divides the value received from the addition circuit 32 by N, thus obtaining a mean value for the sampling points $s_{4i}$, which are the upper peak points of the analog reproducing signal. In what follows, the mean value of the sampling points $s_{4i}$ will be referred to as "$Ts_{mean}$." Again, the division circuit 35 divides the value received from the addition circuit 33 by N, thus obtaining a mean value for the sampling points $s_{4i+2}$, which are the lower peak points of the analog reproducing signal. In what follows, the mean value of the sampling points $s_{4i+2}$ will be referred to as "$Bs_{mean}$." Next, the division circuits 34 and 35 send $Ts_{mean}$ and $Bs_{mean}$ to the subtraction circuit 36. The subtraction circuit 36 subtracts $Bs_{mean}$ from $Ts_{mean}$, thus obtaining a mean amplitude value for the short marks, and outputs this value to the division circuit 9. In other words, the subtraction circuit 36 calculates ($Ts_{mean}-Bs_{mean}$), and outputs this value to the division circuit 9 as the short mark mean amplitude value.

After reproducing of the short mark recording domain 23, the light beam, still projected by the semiconductor laser 12 at the predetermined initial reproducing power, is projected onto the long mark recording domain 24. Then, as with reproducing of the short mark recording domain 23, an analog reproducing signal is sent to the A/D converter 5. Then the A/D converter 5, in accordance with the timing of the clock signal outputted by the clock producing circuit 4, produces digital reproducing signals from the analog reproducing signal, and outputs the digital reproducing signals to the long mark level detecting circuit 7.

Figure 10:
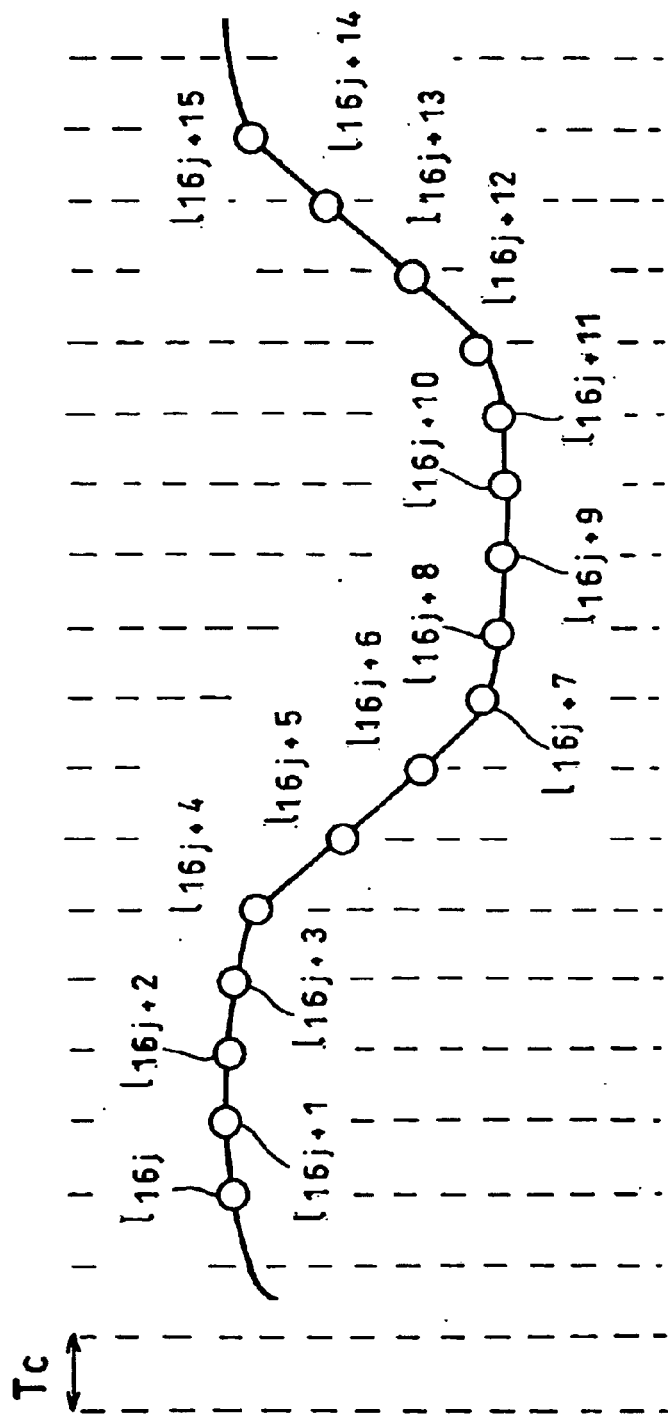
FIG. 10 is an explanatory drawing showing sampling by an A/D converter of an analog reproducing signal obtained from a long mark recording domain of the magneto-optical disk shown in FIG. 2.

FIG. 10 is an explanatory drawing showing sampling by the A/D converter 5 of an analog reproducing signal obtained from the long mark recording domain 24. In the Figure, sampling points are indicated by "○."

As shown in FIG. 10, the A/D converter 5 samples each cycle of the analog reproducing signal at 16 points. In what follows, as shown in the Figure, the four upper envelope points of the analog reproducing signal will be indicated as sampling points $l_{16j}$, $l_{16j+1}$, $l_{16j+2}$, and $l_{16j+3}$; the four lower envelope points as $l_{16j+8}$, $l_{16j+9}$, $l_{16j+10}$, and $l_{16j+11}$; the four intermediate points passed when traveling from the upper envelope to the lower envelope as sampling points $l_{16j+4}$, $l_{16j+5}$, $l_{16j+6}$, and $l_{16j+7}$; and the four intermediate points passed when traveling from the lower envelope to the upper envelope as sampling points $l_{16j+12}$, $l_{16j+13}$, $l_{16j+14}$, and $l_{16j+15}$. Here, j=0, 1, . . . , M−1. The A/D converter 5 converts the value of the analog reproducing signal at each of these sampling points to a digital reproducing signal, and successively outputs each of these digital reproducing signals.

When it receives the digital reproducing signals outputted by the A/D converter 5, the long mark level detecting circuit 7 stores these digital reproducing signals in the shift register 41 as follows. Namely, digital reproducing signals for the sampling points $l_0$ through $l_{16(M-1)+1}$ are stored in order in the cells $dl_0$ through $dl_{16(M-1)+1}$, 16M in number, of the shift register 41 (shown in FIG. 8). In other words, the digital reproducing signals for the sampling points $l_{16j}$ through $l_{16j+15}$ (j=0, 1, . . . , (M−1)) are stored in the cells $dl_{16j}$ through $dl_{16j+15}$, respectively. The digital reproducing signal stored in each cell is held until reproducing of the long mark recording domain 24 is completed.

When reproducing of the long mark recording domain 24 is complete, the shift register 41 sends all of the digital reproducing signal values for the sampling points $l_{16j}$ through $l_{16j+3}$ (which are stored in the cells $dl_{16j}$ through $dl_{16j+3}$), i.e., the values of the upper envelope points of the analog reproducing signal, to the addition circuit 42. Again, the shift register 41 sends all of the digital reproducing signal values for the sampling points $l_{16j+8}$ through $l_{16j+11}$ (which are stored in the cells $dl_{16j+8}$ through $dl_{16j+11}$), i.e., the values of the lower envelope points of the analog reproducing signal, to the addition circuit 43.

The addition circuit 42 adds all of the digital reproducing signal values for the sampling points $l_{16j}$ through $l_{16j+3}$, and sends the total obtained to the division circuit 44. Again, the addition circuit 43 adds all of the digital reproducing signal values for the sampling points $l_{16j+8}$ through $l_{16j+11}$, and sends the total obtained to the division circuit 45.

The division circuit 44 divides the value received from the addition circuit 42 by 4M, thus obtaining a mean value for the sampling points $l_{16j}$ through $l_{16j+3}$, which are the upper envelope points of the analog reproducing signal. In what follows, the mean value of the sampling points $l_{16j}$ through $l_{16j+3}$ will be referred to as "$Tl_{mean}$." Again, the division circuit 45 divides the value received from the addition circuit 43 by 4M, thus obtaining a mean value for the sampling points $l_{16j+8}$ through $l_{16j+11}$, which are the lower envelope points of the analog reproducing signal. In what follows, the mean value of the sampling points $l_{16j+8}$ through $l_{16j+11}$ will be referred to as "$Bl_{mean}$." Next, the division circuits 44 and 45 send $Tl_{mean}$ and $Bl_{mean}$ to the subtraction circuit 46. The subtraction circuit 46 subtracts $Bl_{mean}$ from $Tl_{mean}$, thus obtaining a mean amplitude value for the long marks, and outputs this value to the division circuit 9. In other words, the subtraction circuit 46 calculates ($Tl_{mean}$−$Bl_{mean}$), and outputs this value to the division circuit 9 as the long mark mean amplitude value.

After receiving the short mark mean amplitude value and the long mark mean amplitude value, the division circuit 9 calculates and outputs to the differential amplifier 10 a mean amplitude ratio, which is a ratio between the two mean amplitude values. In other words, the division circuit 9 calculates ($Ts_{mean}$−$Bs_{mean}$)/($Tl_{mean}$−$Bl_{mean}$), and outputs this value to the differential amplifier 10 as the mean amplitude ratio.

The differential amplifier 10 compares the mean amplitude ratio received from the division circuit 9 with a standard value, and outputs the result of this comparison to the reproducing power control circuit 11. Then the reproducing power control circuit 11 controls the driving current of the semiconductor laser 12 in such a way that feedback reduces the value of the comparison result. By this means, the semiconductor laser 12 projects the light beam at an optimum reproducing power.

After reproducing of the long mark recording domain 24, the light beam, now projected by the semiconductor laser 12 at an optimum reproducing power, is projected onto the data recording domain 25. Then, as with reproducing of the short mark recording domain 23 and the long mark recording domain 24, an analog reproducing signal corresponding to the digital data of the data recording domain 25 is sent to the A/D converter 5.

The A/D converter 5 performs a predetermined A/D conversion of the analog reproducing signal, thus producing digital reproducing signals, which are sent to the data reproducing circuit 8. The data reproducing circuit 8 produces binarized data based on the digital reproducing signals, and sends the binarized data to the error correcting circuit 14. The error correcting circuit 14 corrects errors in the binarized data, and sends it to a binarized data processing device (not shown). Thereafter, on the basis of the binarized data, information corresponding to the digital data is reproduced.

When reproducing of the data recording domain 25 is completed, thus completing reproducing of a single sector 22, another sector 22 adjacent thereto is reproduced in the same way. In reproducing this subsequent sector 22, too, the driving current supplied to the semiconductor laser 12 is first controlled so that the reproducing power thereof is optimum, and then the data recording domain 25 is reproduced.

As discussed above, in the present reproducing device, in order to calculate amplitude values for the short marks and long marks, analog reproducing signals corresponding to a predetermined number of short marks and long marks are sampled, and a short mark mean amplitude value and a long mark mean amplitude value are calculated. Then, a ratio between the short mark mean amplitude value and the long mark mean amplitude value, i.e., a mean amplitude ratio, is calculated, and reproducing power control is performed on the basis of this mean amplitude ratio.

By this means, the error in the value of the mean amplitude ratio calculated can be greatly reduced, and thus the error in control of reproducing power by the reproducing power control circuit 11 can be greatly reduced. Accordingly, with the present reproducing device, reproducing with an optimum light beam can be performed.

In addition, in the magneto-optical disk 1, the short mark recording domains 23 and long mark recording domains 24 are provided in each sector 22. Further, when each sector 22 is reproduced, the driving current supplied to the semiconductor laser 12 is controlled so that the reproducing power of the semiconductor laser 12 is optimum for that sector 22.

In this way, with the present reproducing device, reproducing power control of the semiconductor laser 12 is performed with a short time interval. Accordingly, even if the environment in which the present reproducing device is placed changes in a short time, causing the optimum reproducing power of the semiconductor laser 12 to fluctuate in a short time, the reproducing power of the semiconductor laser 12 can always be controlled to an optimum level. In other words, with the present reproducing device, control of the reproducing power of the semiconductor laser 12 can respond to rapid fluctuations in the optimum reproducing power.

The following will explain the precision of control of the reproducing power of the semiconductor laser 12 in the present reproducing device. This precision depends on the precision of the comparison result outputted by the differential amplifier 10, and this comparison result, in turn, depends on the precision of the mean amplitude ratio calculated by the division circuit 9. Further, the precision of the mean amplitude ratio $(Ts_{mean}-Bs_{mean})/(Tl_{mean}-Bl_{mean})$ depends on the mean number of bytes of short marks and of long marks.

As mentioned above, the error correcting circuit 14 of the present reproducing device is capable of correcting errors with certainty when the bit error rate (BER) of the binarized data received from the data reproducing circuit 8 is 1E-4 ($1 \times 10^{-4}$) or less. In other words, it is preferable if the BER of the binarized data received from the data reproducing circuit 8 is within this range.

Further, in order to keep the BER of the binarized data within this range, it is preferable if the size of the aperture formed on the magneto-optical disk 1 by the present reproducing device is always within a predetermined size range. Further, at a constant ambient temperature, the size of the aperture corresponds with the reproducing power. Accordingly, it can be said that, at a constant ambient temperature, there is a reproducing power range capable of keeping the size of the aperture within a predetermined range.

Further, control of reproducing power by the Age reproducing power control circuit 11 is performed in such a way that the reproducing power is at an optimum level, but, as mentioned above, this control is based on the comparison result outputted by the differential amplifier 10. This comparison result includes an error of a size corresponding to an error included in the mean amplitude ratio calculated by the division circuit 9. Accordingly, the control performed by the reproducing power control circuit 11 includes an error equivalent to the error in the comparison result of the differential amplifier 10.

Accordingly, it is preferable if the error of the comparison result outputted by the differential amplifier 10 is within a range which ensures that the reproducing power produced by the reproducing power control circuit 11 is within the preferable reproducing power range mentioned above.

The comparison result of the differential amplifier 10 is obtained from the standard value and the mean amplitude ratio. Further, the standard value is the value of a previously detected mean amplitude ratio. Accordingly, it can be said that the error in the comparison result of the differential amplifier 10 is double the error of the mean amplitude ratio outputted by the division circuit 9.

Accordingly, if the error in the mean amplitude ratio outputted by the division circuit 9 is no more than one-half of the allowable range of error in the comparison result of the differential amplifier 10, the BER of the binarized data outputted by the data reproducing circuit 8 can be held to 1E-4 or less. Furthermore, the range of error of the mean amplitude ratio corresponds with the mean number of bytes of short marks and of long marks in the short mark recording domain 23 and the long mark recording domain 24, respectively. In light of this fact, the following will explain the range of error in the mean amplitude ratio and the preferable mean number of bytes of short marks and of long marks.

Figure 11:
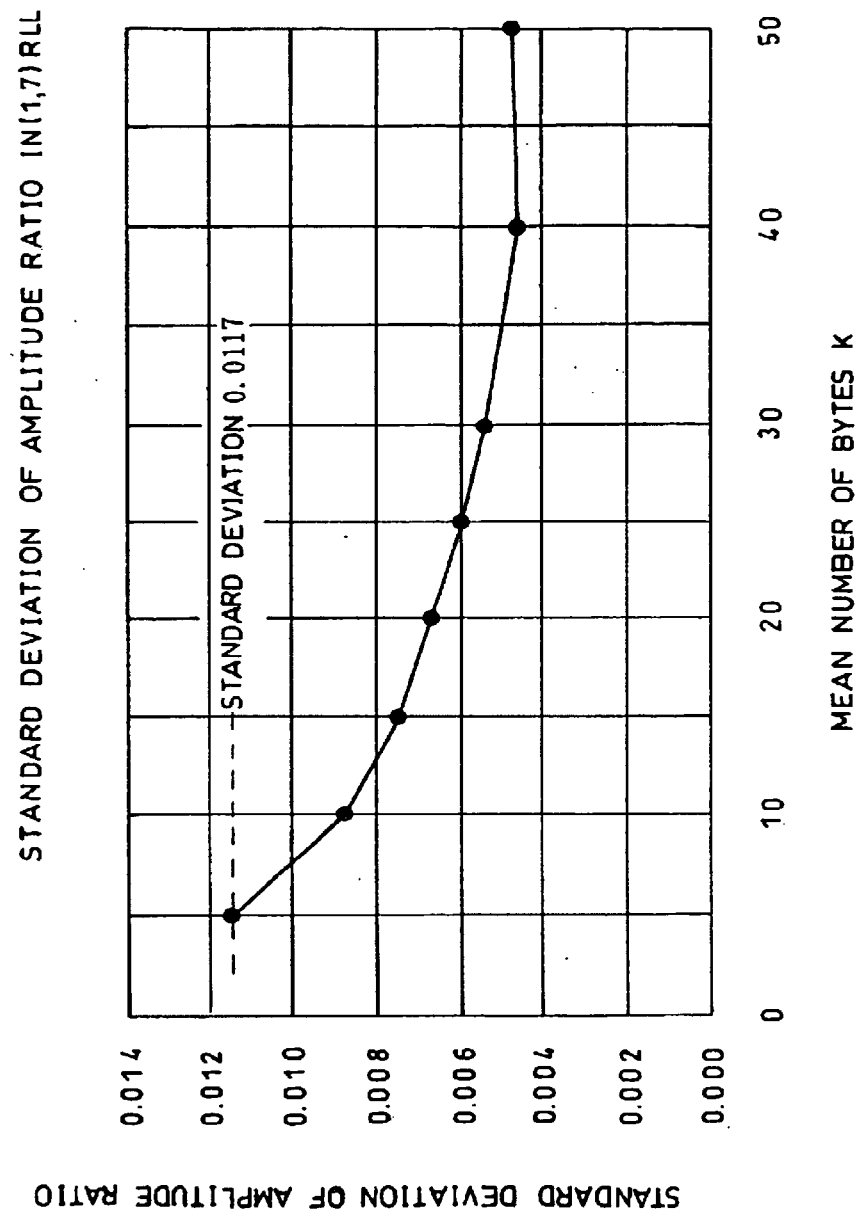
FIG. 11 is a graph showing the results of measurement of the relationship between (i) a mean number of bytes of the magneto-optical disk short marks and long marks shown in FIG. 4 and (ii) precision of a mean amplitude ratio detected by the optical reproducing device shown in FIG. 1.

FIG. 11 is a graph showing the results of measurement of the relationship between a mean number of bytes K of short marks and of long marks in the magneto-optical disk 1 and the precision of the mean amplitude ratio detected by the present reproducing device.

As mentioned above, the short and long marks measured here were recorded by means of (1,7)RLL modulation. Further, in the Figure, precision of the mean amplitude ratio is shown as a standard deviation. This standard deviation was obtained from the distribution of the results of detection of mean amplitude ratio 100 times (the results of 100 reproductions of sectors 22), and the size of the standard deviation corresponds to the size of the distribution, i.e., the precision of the detected mean amplitude ratios.

Figure 12:
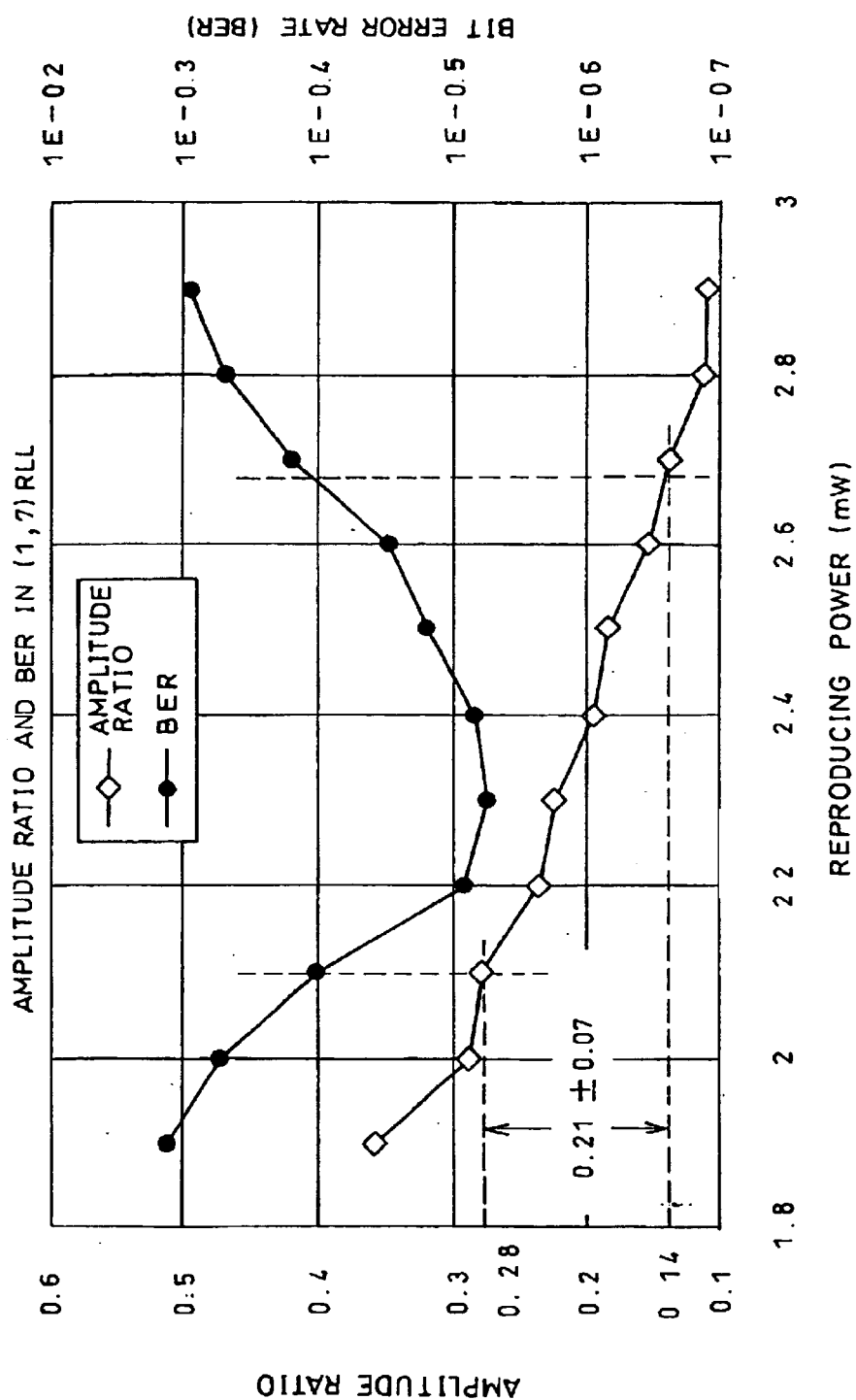
FIG. 12 is a graph, showing the results of measurement, in the optical reproducing device shown in FIG. 1, of the relationship between (i) reproducing power of the semiconductor laser and (ii) the BER of binarized data obtained from the data reproducing circuit; and of the relationship between (i) the same reproducing power and (iii) a mean amplitude ratio calculated by the division circuit.

FIG. 12 is a graph showing the results of measurement of the relationship between reproducing power of the semiconductor laser 12 and the BER of the binarized data obtained from the data reproducing circuit 8, and of the relationship between reproducing power and the mean amplitude ratio calculated by the division circuit 9. These measurements were made at a constant ambient temperature.

As FIG. 12 shows, the reproducing power at which the BER is 1E-4 or less is approximately 2.10 mW to 2.68 mW. In other words, the preferable reproducing power range at this ambient temperature is approximately 2.10 mW to 2.68 mW. Further, when the reproducing power is within this range, the mean amplitude ratio is within a range from 0.14 through 0.28. In other words, the mean amplitude ratio is 0.21±0.07, and the standard value inputted to the differential amplifier 10 is 0.21.

Accordingly, at this ambient temperature, the reproducing power control circuit 11 controls the reproducing power so that the mean amplitude ratios approach 0.21. Thus it can be seen that the allowable range of error in control performed by the reproducing power control circuit 11, i.e., the allowable range of error in the comparison result of the differential amplifier 10, is ±0.07. Accordingly, it can be seen that the allowable range of error in the mean amplitude ratio outputted by the division circuit 9 is ±0.035 (±0.07/2) or less.

Incidentally, the ranges of allowable error in the comparison result of the differential amplifier 10 and the mean amplitude ratio of the division circuit 9 change little even if the ambient temperature changes. The reasons for this will be explained below.

The measured results shown in FIG. 12 vary according to ambient temperature. In other words, when the ambient temperature rises, the mean amplitude ratio with respect to reproducing power shifts, in principle, in the direction of low power. Further, in such a case, the BER with respect to reproducing power also shifts in the direction of low power. Accordingly, change in ambient temperature results in almost no change in the range of the mean amplitude ratio needed to keep the BER within the range of 1E-4 or less. In addition, change in the standard deviation of the mean amplitude ratio (shown in FIG. 11) resulting from change in ambient temperature is, at reproducing powers necessary to keep the BER within the foregoing range, small enough to be ignored. This also holds true for measurements of a magneto-optical disk using NRZI modulation, to be discussed below.

Accordingly, the ranges of allowable error in the comparison result of the differential amplifier 10 and the mean amplitude ratio of the division circuit 9 can be treated as ranges not dependent upon ambient temperature.

According to statistics, when $\sigma$ is the standard deviation of the mean amplitude ratio distribution (which can substantially be considered a normal distribution), if $3\sigma$ is 0.035 or less, the error in the mean amplitude ratio has better than a 99.7% probability of falling within ±0.035. Accordingly, in order for the error in detecting the mean amplitude ratio to be within ±0.035, it can be seen that it is preferable if a is 0.0117 (0.035/3) or less. Further, from FIG. 11, it can be seen that the standard deviation is 0.0117 or less when the mean number of bytes K is 5 bytes or more. Accordingly, it can be said that it is preferable if the mean number of bytes K of short marks and of long marks is 5 bytes or more.

Further, as shown by FIG. 11, if the mean number of bytes K is 40 bytes or more, there is almost no variation in the standard deviation. Consequently, a mean number of bytes K of 40 bytes or less is sufficient.

The following will discuss the error in detecting the mean amplitude ratio with a magneto-optical disk using NRZI modulation. This magneto-optical disk has the structure of the magneto-optical disk 1, except that a pattern of repeated short marks 2Tc in length, with an interval between marks of 1Tc, is recorded in the short mark recording domain 23, and a pattern of repeated long marks 8Tc in length, with an interval between marks of 8Tc, is recorded in the long mark recording domain 24.

Figure 13:
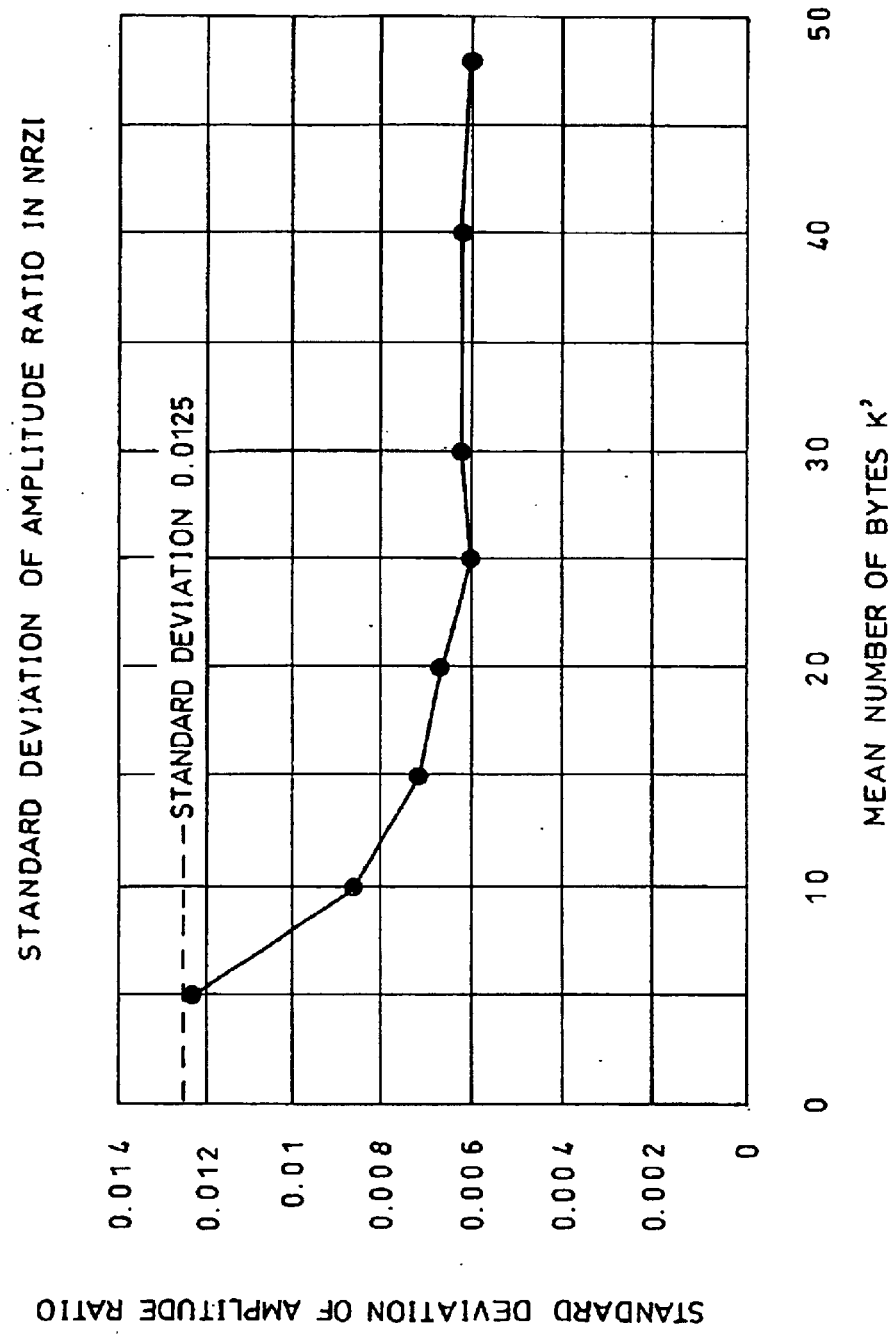
FIG. 13 is a graph showing the results of measurement of the relationship between (i) a mean number of bytes of short marks and of long marks in a magneto-optical disk whose modulation method is NRZI modulation and (ii) precision of a mean amplitude ratio detected by the optical reproducing device shown in FIG. 1.

FIG. 13 is a graph showing the results of measurement of the relationship between the mean number of bytes K' of short marks and of long marks and precision of the mean amplitude ratio detected by the present reproducing device. Here, as in FIG. 11, precision of the mean amplitude ratio is shown as a standard deviation. This standard deviation was obtained from the distribution of the results of detection of mean amplitude ratio 100 times. As shown in the Figure, if the mean number of bytes K' is 25 bytes or more, there is almost no variation in the standard deviation.

Figure 14:
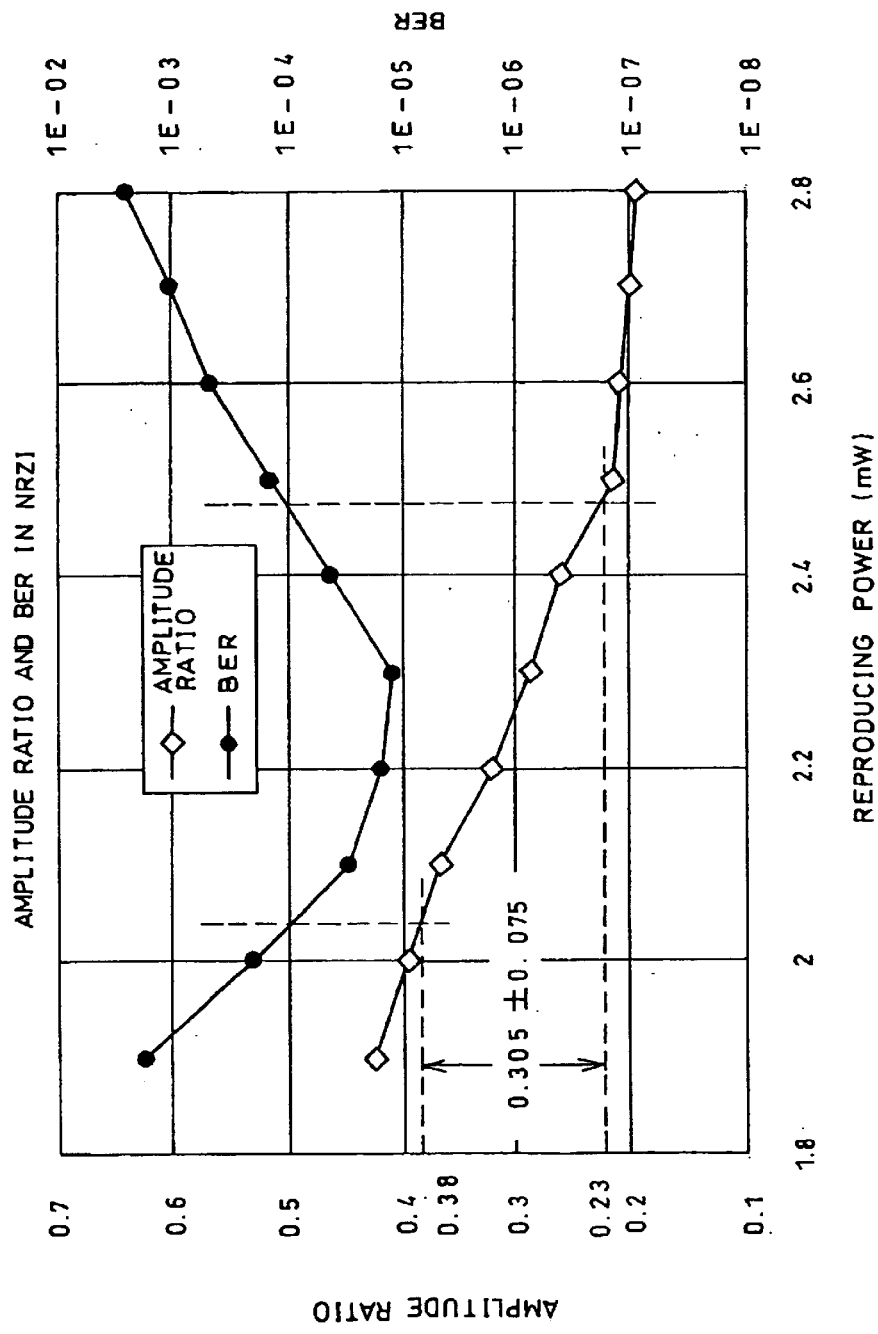
FIG. 14 is a graph showing the results of measurement, when reproducing a magneto-optical disk whose modulation method is NRZI modulation in the optical reproducing device shown in FIG. 1, of the relationship between (i) reproducing power of the semiconductor laser and (ii) the BER of binarized data obtained from the data reproducing circuit; and of the relationship between (i) the same reproducing power and (iii) a mean amplitude ratio calculated by the division circuit.

FIG. 14 is a graph showing the results of measurement, when reproducing this magneto-optical disk in the present reproducing device, of the relationship between reproducing power of the semiconductor laser 12 and the BER of the binarized data obtained from the data reproducing circuit 8, and of the relationship between reproducing power and the mean amplitude ratio calculated by the division circuit 9. These measurements were made at a constant ambient temperature.

As FIG. 14 shows, with a reproducing power at which the BER is 1E-4 or less, the mean amplitude ratio is within a range from 0.23 through 0.38. In other words, at this ambient temperature, the mean amplitude ratio is 0.305±0.075, and the standard value inputted to the differential amplifier 10 is 0.305. Further, this range of ±0.075, for the reasons explained above, changes little according to ambient temperature.

Accordingly, in light of the same factors considered with the magneto-optical disk 1 recorded using (1,7)RLL modulation, it can be seen that it is preferable if the standard deviation a of the mean amplitude ratio distribution is 0.0125 (0.075/2/3) or less. Thus, it can be seen from FIG. 13 that the average number of bytes K' should preferably be 5 bytes or more.

To summarize the foregoing results, it is preferable if the mean number of bytes of the recorded marks for reproducing power control is at least 5 bytes, and is sufficient if it is 40 bytes or less. In other words, it is preferable if the quantity of data recorded in each short mark recording domain 23 and long mark recording domain 24 is 5 bytes or more and 40 bytes or less.

Accordingly, if 5 bytes or more and 40 bytes or less of recorded marks for reproducing power control are recorded in the magneto-optical disk 1, reproducing power control can be performed with sufficiently high precision, and in a short time, without impairing the efficiency of use of the magneto-optical disk 1.

Figure 15:
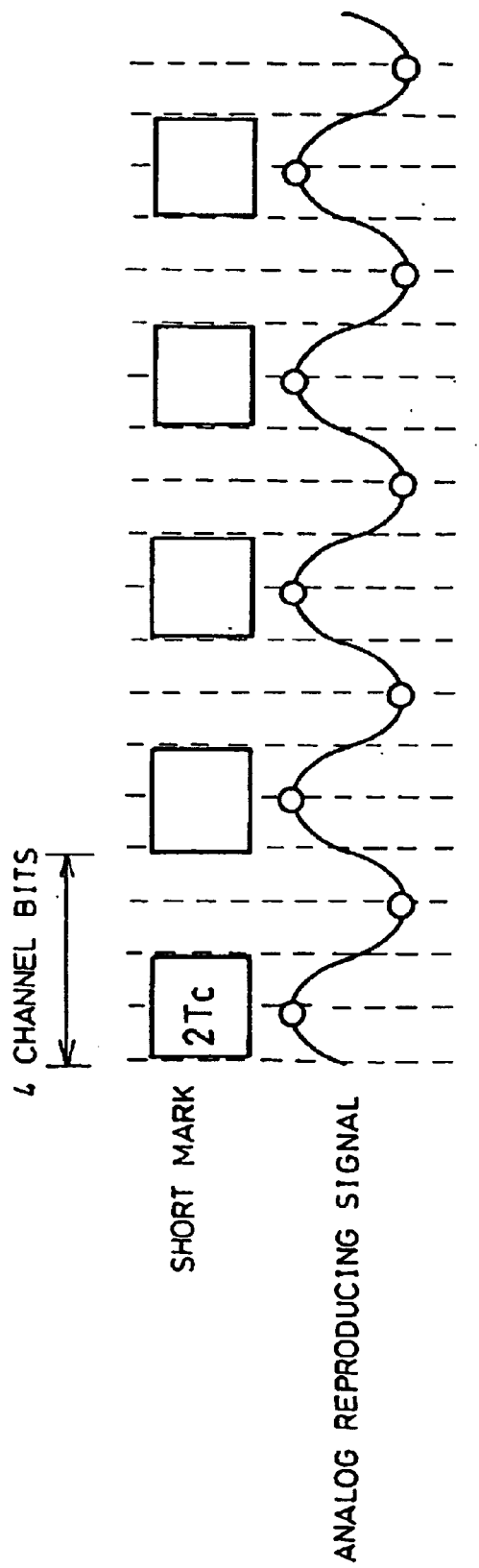
FIG. 15 is an explanatory drawing showing short marks recorded by means of (1,7)RLL modulation, and sampling of an analog reproducing signal corresponding to these short marks.
Figure 16:
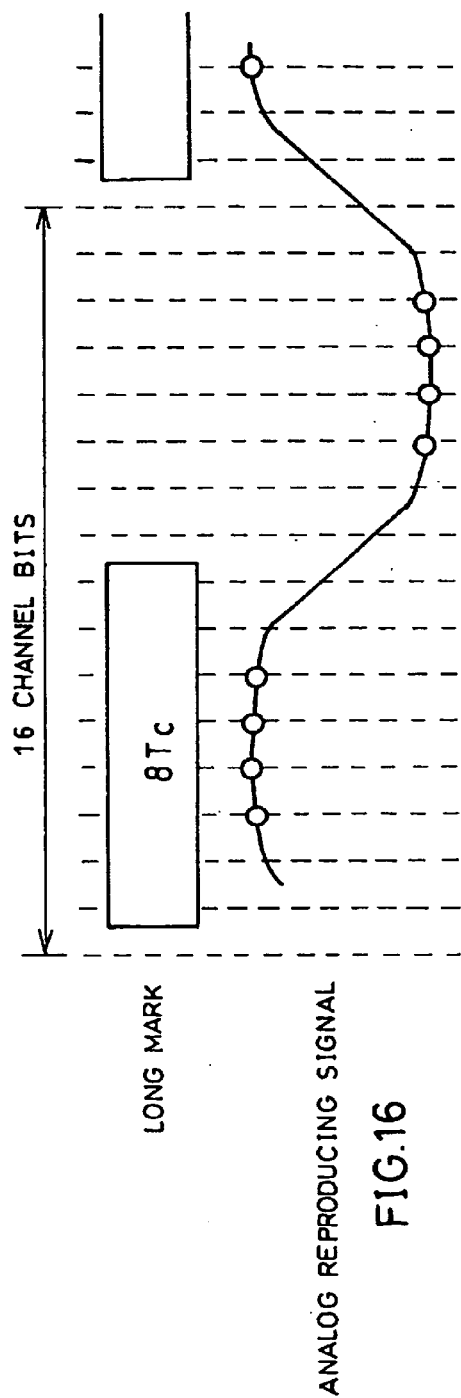
FIG. 16 is an explanatory drawing showing long marks recorded by means of (1,7)RLL modulation, and sampling of an analog reproducing signal corresponding to these long marks.

As shown in FIG. 15, with sampling of an analog reproducing signal corresponding to short marks recorded using (1,7)RLL modulation, one upper and one lower peak point are sampled for every four channel bits. Thus three amplitude value samples can be obtained per byte (12 channel bits). Again, as shown in FIG. 16, with sampling of an analog reproducing signal corresponding to long marks recorded using (1,7)RLL modulation, four upper and four lower envelope points are sampled for every 16 channel bits. Thus three amplitude value samples can be obtained per byte.

Figure 17:
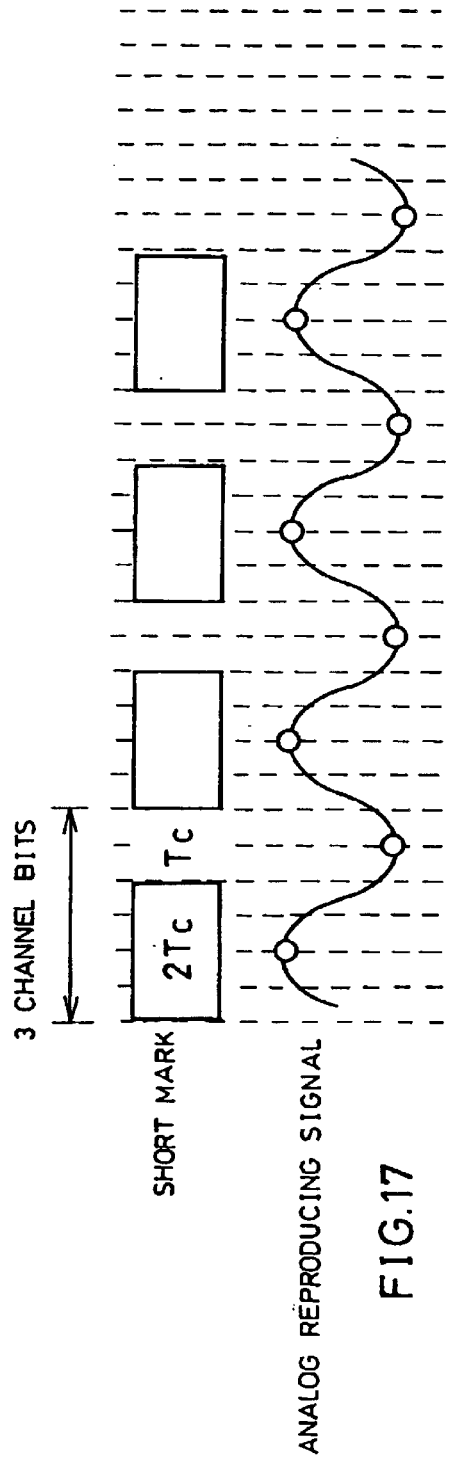
FIG. 17 is an explanatory drawing showing short marks recorded by means of NRZI modulation, and sampling of an analog reproducing signal corresponding to these short marks.
Figure 18:
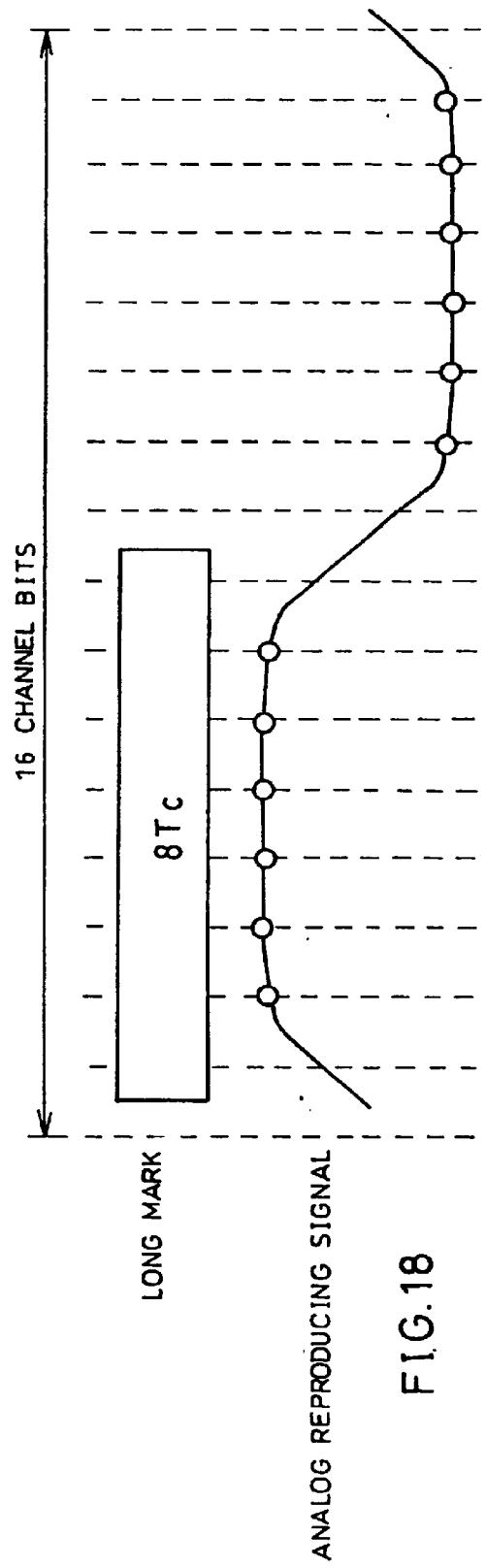
FIG. 18 is an explanatory drawing showing long marks recorded by means of NRZI modulation, and sampling of an analog reproducing signal corresponding to these long marks.

As shown in FIG. 17, with sampling of an analog reproducing signal corresponding to short marks recorded using NRZI modulation, one upper and one lower peak point are sampled for every three channel bits. Thus approximately 2.7 (=8/3) amplitude value samples can be obtained per byte (8 channel bits). Again, as shown in FIG. 18, with sampling of an analog reproducing signal corresponding to long marks recorded using NRZI modulation, six upper and six lower envelope points are sampled for every 16 channel bits. Thus three amplitude value samples can be obtained per byte.

Accordingly, with marks for reproducing power control recorded by (1,7)RLL modulation, it can be seen that if at least 15 samples are made, the error in detecting the mean amplitude ratio will be within ±0.035. Further, it can be seen that a number of samples of 120 or less is sufficient.

Here, "number of samples" means the number of amplitude values used to calculate the mean amplitude values.

Again, with marks for reproducing power control recorded by NRZI modulation, it can be seen that if at least (40/3), i.e., 14 samples are made, the error in detecting the mean amplitude ratio will be within ±0.035. Further, it can be seen that a number of samples of 120 or less is sufficient.

Accordingly, it can be seen that, regardless of whether the modulation method of the magneto-optical disk is (1,7)RLL modulation or NRZI modulation, the number of short marks and of long marks should each preferably be 15 or more and 120 or less.

Incidentally, it was mentioned above that the error correcting circuit 14 of the present reproducing device is capable of correcting errors with certainty when the BER of the binarized data received from the data reproducing circuit 8 is 1E-4 or less. This correcting ability is equivalent to that of error correcting circuits used in typical optical reproducing devices. In other words, a BER of 1E-4 or less is also considered preferable in conventional optical reproducing devices.

The preferable ranges of the mean numbers of bytes K and K' and the number of samples of the recorded marks for reproducing power discussed above may vary slightly depending on the reproducing characteristics of the optical reproducing device. However, reproducing characteristics of optical reproducing devices are not thought to vary so widely as to fall completely outside these ranges.

Further, in the present embodiment, the reproducing power of the semiconductor laser 12 is controlled by a driving current, but in actuality, reproducing power also fluctuates according to ambient temperature. However, in the present reproducing device, since reproducing power is controlled so that the mean amplitude ratio is constant, the reproducing power can be maintained at an optimum level even if the optimum level changes due to a change in ambient temperature.

In order to compensate for fluctuations in reproducing power due to changes in ambient temperature, a technology known as "APC" (Auto Power Control) may also be used. By performing feedback of the difference between a previously set reproducing power and the current reproducing power, this technology maintains the reproducing power at the set reproducing power even if the ambient temperature changes. In other words, the present reproducing device may be provided with a structure for performing APC, and the foregoing set reproducing power may be controlled by the reproducing power control circuit 11.

Again, the present reproducing device is structured so that the short mark level detecting circuit 6 and the long mark level detecting circuit 7 are provided with shift registers 31 and 41, respectively. In calculating the mean amplitude values for the short marks and the long marks, these means are calculated after inputting a predetermined number of digital reproducing signal values into the shift registers 31 and 41, respectively. However, there is no need to be limited to the structure of the present reproducing device.

In other words, instead of storing in a shift register the digital reproducing signal values for the upper and lower peak points inputted to the short mark level detecting circuit 6, they each may be cumulatively added, and when all of the respective values have been added, a short mark mean amplitude value may be found by dividing the respective sums by the number of samples, and then finding the difference between the two divided values.

In the same way, instead of storing in a shift register the digital reproducing signal values for the upper and lower peak points inputted to the long mark level detecting circuit 7, they each may be cumulatively added, and when all of the respective values have been added, a long mark mean amplitude value may be found by dividing the respective sums by the number of samples, and then finding the difference between the two divided values.

Again, the short mark level detecting circuit 6 may be structured so as to extract from the digital reproducing signals corresponding to the short marks only the sampling points at the upper and lower peaks of the analog reproducing signal, find a mean thereof, and output this as the short mark mean amplitude value. In the same way, the long mark level detecting circuit 7 may be structured so as to extract from the digital reproducing signals corresponding to the long marks only the sampling points at the upper and lower peaks of the analog reproducing signal, find a mean thereof, and output this as the long mark mean amplitude value.

Again, the foregoing embodiment explains reproducing of a magneto-optical disk which uses the magnetic ultra high resolution method, but memory media which can be reproduced by the present reproducing device are not limited to this. The present reproducing device may also be structured so as to be able to reproduce magneto-optical disks which do not use the magnetic ultra high resolution method, optical disks, optical cards, optical tape, etc.

Again, the recording tracks 21 of the magneto-optical disk 1 are provided in the form of concentric circles, but the magneto-optical disk 1 may instead be provided with tracks in the form of a spiral.

In addition, the short marks and long marks of the magneto-optical disk 1 need not be formed in advance in the short mark recording domain 23 and the long mark recording domain 24. It is sufficient if the magneto-optical disk 1 is provided with domains of a predetermined size (for example, 5 bytes or more and 40 bytes or less) for forming of the short marks and long marks. Then, prior to reproducing, the user's desired recorded marks for reproducing power control may be recorded in these domains 23 and 24.

Further, in the present reproducing device, the short mark level detecting circuit 6 and the long mark level detecting circuit 7 perform reproducing power control using upper and lower peak points in sampling, but the structure of the present reproducing device is not limited to this. The short mark level detecting circuit 6 and the long mark level detecting circuit 7 may use any sampling points from which a short mark mean amplitude value and a long mark mean amplitude value can be calculated.

In other words, the short mark level detecting circuit 6 and the long mark level detecting circuit 7 may extract, from the digital reproducing signals corresponding to the short marks and long marks, the size of the analog reproducing signal at a predetermined phase (for example, the size at a phase corresponding to the shoulder of the analog reproducing signal). Then, based on the extracted signal size, the short mark level detecting circuit 6 and the long mark level detecting circuit 7 may calculate the short mark mean amplitude value and long mark mean amplitude value of this analog reproducing signal.

As discussed above, the device for controlling quantity of reproducing light in the first optical reproducing device according to the present invention uses an optical memory medium from which data recorded in a recording layer is reproduced by forming on a reproducing layer an aperture smaller in diameter than the spot of a light beam projected thereon, and includes control means which control reproducing power by detecting a reproducing signal from marks for reproducing power control recorded in the optical memory medium; in which the control means control reproducing power on the basis of the reproducing signal obtained by reproducing 5 bytes or more and 40 bytes or less of the marks for reproducing power control.

Further, the device for controlling quantity of reproducing light in the second optical reproducing device according to the present invention uses an optical memory medium from which data recorded in a recording layer is reproduced by forming on a reproducing layer an aperture smaller in diameter than the spot of a light beam projected thereon, and includes control means which control reproducing power by detecting a reproducing signal from marks for reproducing power control recorded in the optical memory medium; in which the control means control reproducing power on the basis of the reproducing signal obtained by reproducing the marks for reproducing power control, making (40/3) or more samples and 120 or more samples thereof.

Further, the device for controlling quantity of reproducing light in the third optical reproducing device according to the present invention has the structure of the device for controlling quantity of reproducing light in either the first or second optical reproducing device, further provided with averaging means which average a plurality of amplitude values obtained by A/D conversion of the reproducing signal.

If the recording domains for the marks for reproducing power control are too large, the efficiency of use of the magneto-optical disk is impaired. If these recording domains are too small, on the other hand, the distribution of the calculated mean amplitude ratios is increased, and the error in reproducing power control is increased.

With the foregoing structures of the devices for controlling quantity of reproducing light in the first through third optical reproducing devices, the recording domains for the marks for reproducing power control are of a suitable size, and thus the efficiency of use of the magneto-optical disk can be increased, and sufficiently precise control of reproducing power is possible.

Further, a first optical memory medium according to the present invention is an optical memory medium from which data recorded in a recording layer is reproduced by forming on a reproducing layer an aperture smaller in diameter than the spot of a light beam projected thereon, in which are recorded 5 bytes or more and 40 bytes or less of marks for reproducing power control.

Further, a second optical memory medium according to the present invention has the structure of the first optical memory medium, in which the marks for reproducing power control are made up of a pattern of repeated short marks and a pattern of repeated long marks, and each of these patterns is 5 bytes or more and 40 bytes or less in quantity.

Further, a third optical memory medium according to the present invention has the structure of the first optical memory medium, in which the marks for reproducing power control are provided in each sector.

With the first through third optical memory mediums with the respective foregoing structures, it is possible to attain both efficient use of the optical memory medium, by enlarging data recording domains, and precise reproducing power control. Further, by providing recording domains for marks for reproducing power control in each sector, reproducing power can be controlled for each sector, and thus reproducing power control can respond with a short time interval. Accordingly, it becomes possible to respond to rapid fluctuations in optimum reproducing power.

[Second Embodiment]

The second embodiment of the present invention will be explained below.

Figure 19:
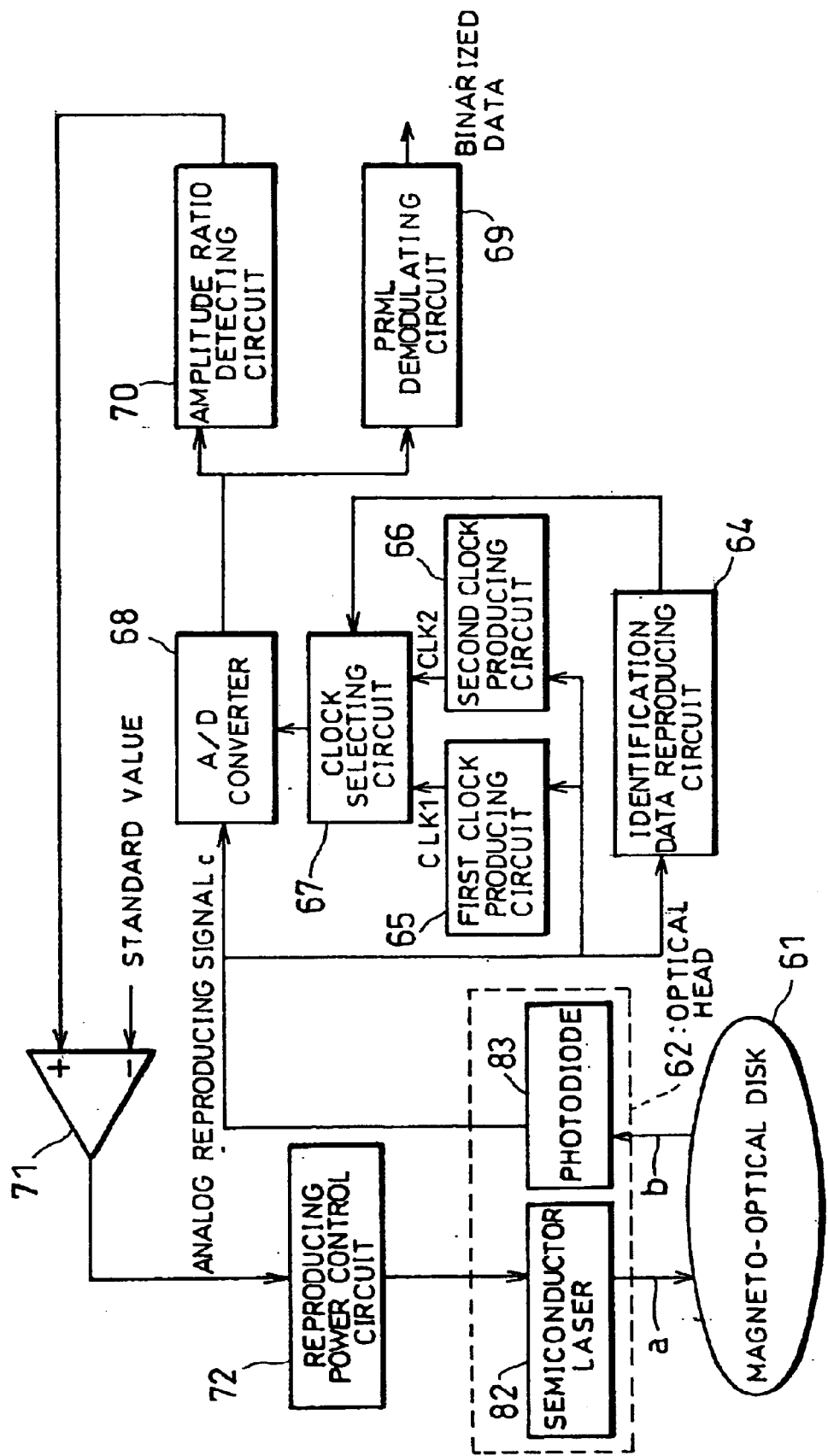
FIG. 19 is an explanatory drawing showing the structure of an optical reproducing device according to the second embodiment of the present invention.

FIG. 19 is an explanatory drawing showing the structure of a magnetic ultra high resolution optical reproducing device (hereinafter referred to as "the present reproducing device"). As shown in the Figure, the present reproducing device is made up of an optical head 62, an identification data reproducing circuit 64, a first clock producing circuit 65, a second clock producing circuit 66, a clock selecting circuit 67, an A/D converter 68, a PRML demodulating circuit 69, an amplitude ratio detecting circuit 70, a differential amplifier 71, and a reproducing power control circuit 72. Further, the magneto-optical disk 61 shown in FIG. 19 is an optical memory medium to be reproduced by the present reproducing device.

First, the structure of the magneto-optical disk 61 will be explained. The magneto-optical disk 61 is provided with a reproducing layer and a recording layer, and is a magnetic ultra high density magneto-optical memory medium from which digital data recorded in the recording layer is reproduced by forming on the reproducing layer an aperture smaller in diameter than a light beam spot projected thereon.

Figure 20:
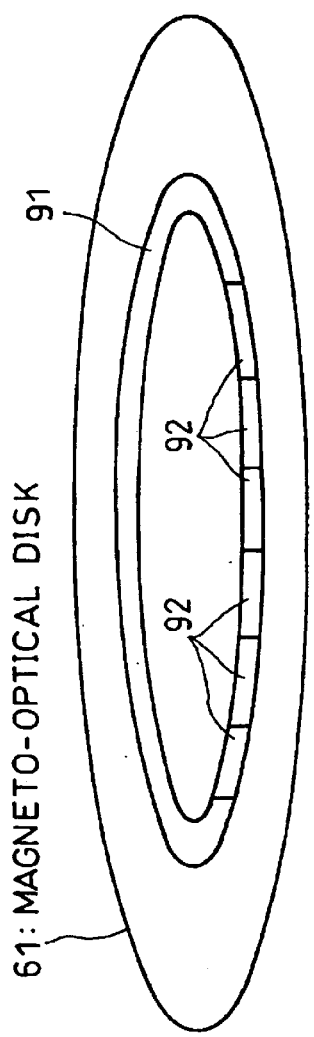
FIG. 20 is an explanatory drawing showing the structure of a magneto-optical disk for reproducing by the optical reproducing device shown in FIG. 19.

FIG. 20 is an explanatory drawing showing the structure of the magneto-optical disk 61. As shown in the Figure, a recording track 91 is formed in the shape of a circular band concentric with the circular magneto-optical disk 61. Further, in the recording track 91 are successively formed a plurality of sectors 92.

Figure 21:
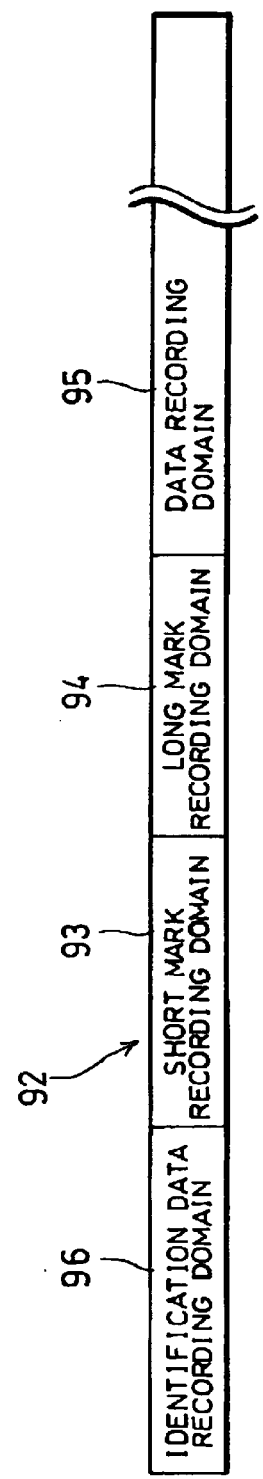
FIG. 21 is an explanatory drawing showing the structure of sectors formed in the magneto-optical disk shown in FIG. 20.

FIG. 21 is an explanatory drawing showing the structure of a sector 92. As shown in the Figure, in each sector 92 are formed a short mark recording domain 93, a long mark recording domain 94, a data recording domain 95, and an identification recording domain 96.

The short mark recording domains 93 (reproducing power control domains) are domains in which are formed short marks, which are marks for reproducing power control. The long mark recording domains 94 (reproducing power control domains) are domains in which are formed long marks, which are also marks for reproducing power control. The data recording domains 95 are domains in which the user's desired data is recorded as digital data. The modulation method for this digital data recorded in the data recording domains 95 is not limited to any particular modulation method, but in what follows, it will be assumed that digital data modulated by the (1,7)RLL (Run Length Limited) modulation method is recorded in the data recording domains 95.

Figure 22:
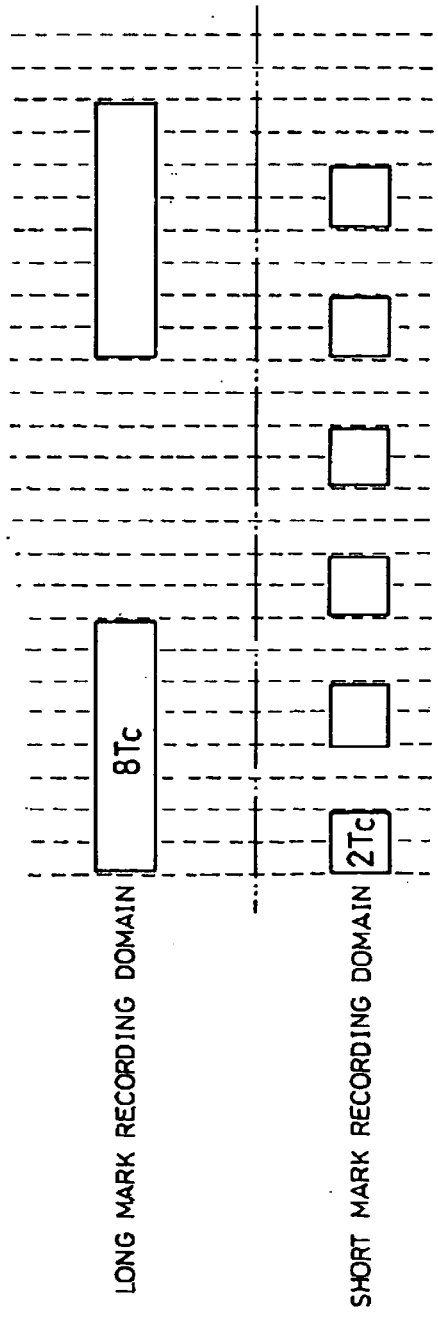
FIG. 22 is an explanatory drawing showing short marks and long marks formed in the magneto-optical disk shown in FIG. 20.

FIG. 22 is an explanatory drawing showing the short marks and long marks. As shown in the Figure, in the long mark recording domain 94, long marks having a mark length of 8Tc (Tc being the length of a channel bit) are successively formed at an interval of 8Tc. In the same way, in the short mark recording domain 93, short marks having a mark length of 2Tc are successively formed at a mark interval of 2Tc. In what follows, the number of short marks and long marks formed in the short mark recording domain 93 and the long mark recording domain 94 will be N marks and M marks, respectively (N and M being predetermined natural numbers).

The identification data recording domain 96 (disk information domain) is a domain in which are recorded in advance identification data for identifying the modulation method of the digital data recorded in the data recording domain 95 (hereinafter the "modulation method identification data") and identification data for identifying the state of recording of the recorded marks for reproducing power control, made up of the short and long marks (hereinafter the "control mark identification data"). Here, the state of recording of the recorded marks for reproducing power control means the sizes of the short mark recording domain 93 and the long mark recording domain 94, the mark lengths and number of short and long marks recorded therein, the frequency and phase of a clock signal suited to sampling of an analog reproducing signal corresponding to the short and long marks, etc.

The following will explain each of the structures of the present reproducing device, shown in FIG. 19.

The optical head 62 (reproducing signal production section) includes a semiconductor laser 82 and a photodiode 83. The semiconductor laser 82 (reproducing signal production section) projects a light beam a onto the recording track 91 of the magneto-optical disk 61 at a predetermined reproducing power. The photodiode 83 (reproducing signal production section) receives light reflected from each of the domains 93 through 96 of the sector 92 of the recording track 91, and produces and outputs an analog reproducing signal corresponding to this reflected light. In what follows, this analog reproducing signal obtained from the magneto-optical disk 61 will be referred to as the "analog reproducing signal c."

The identification data reproducing circuit 64 (digital signal output section; clock signal selecting section; recorded mark judging section) receives the analog reproducing signal c produced by the photodiode 83, and obtains the modulation method identification data and the control mark identification data from the analog reproducing signal c corresponding to the identification data recording domain 96 of a single sector 92. The identification data reproducing circuit 64 then identifies, from the two kinds of identification data, the type of modulation method and the characteristics of the recorded marks for reproducing power control, and sends these to the clock selecting circuit 67. In what follows, the type of modulation method and the characteristics of the recorded marks for reproducing power control of the magneto-optical disk 61 identified and sent by the identification data reproducing circuit 64 will be referred to as the "disk information."

The first clock producing circuit 65 (digital signal output section; clock signal producing section; first clock signal producing circuit) receives the analog reproducing signal c, and on the basis thereof, by means of PLL (Phase Locked Loop), produces and outputs a bit cycle clock signal CLK1. In the same way, the second clock producing circuit 66 (digital signal output section; clock signal producing section; second clock signal producing circuit) receives the analog reproducing signal c, and on the basis thereof, by means of PLL (Phase Locked Loop), produces and outputs a bit cycle clock signal CLK2.

Figure 23:
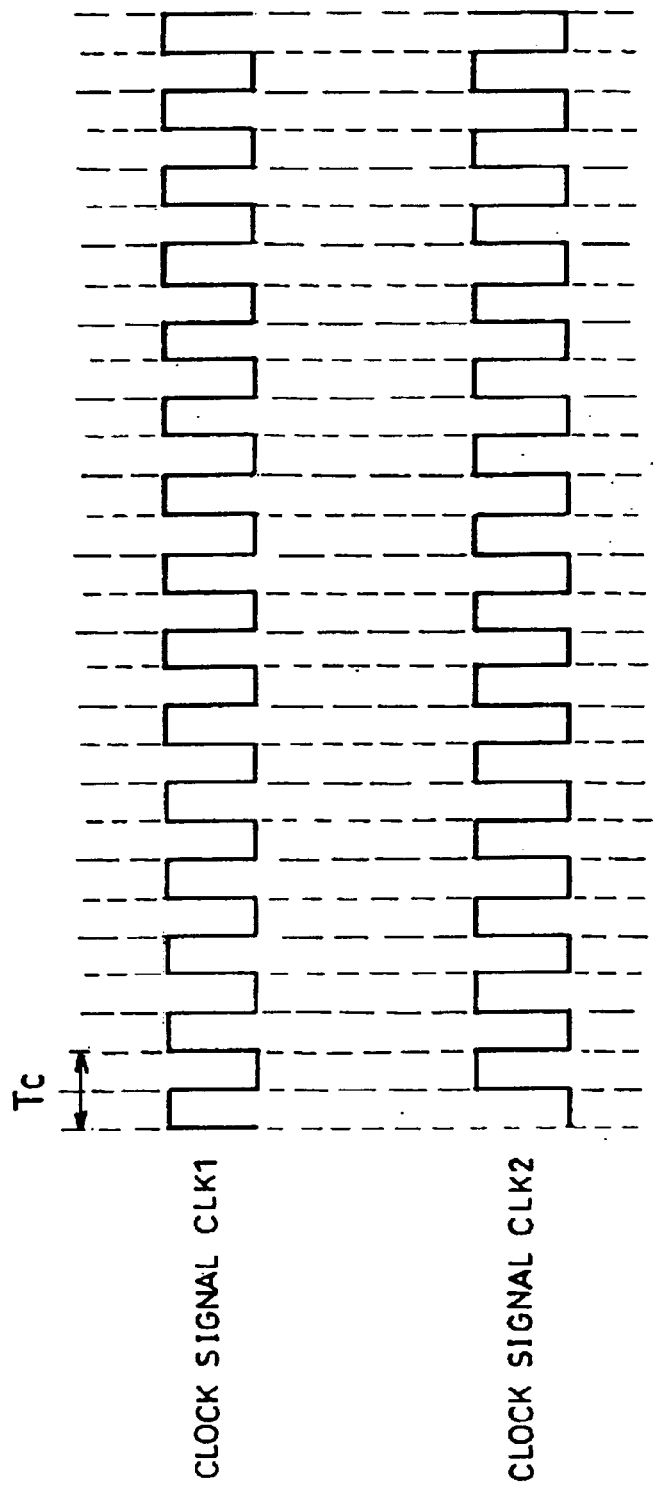
FIG. 23 is an explanatory drawing showing clock signals produced by a first clock producing circuit and a second clock producing circuit in the optical reproducing device shown in FIG. 19.

FIG. 23 is an explanatory drawing showing the clock signals CLK1 and CLK2. As shown in the Figure, the clock signal CLK1 and the clock signal CLK2 have the same frequency, but their phases differ by one-half cycle. In other words, the phase of the clock signal CLK2 is offset one-half cycle (180°) with respect to the phase of CLK1.

The clock selecting circuit 67 (digital signal output section; clock signal selecting section; clock signal selecting circuit) receives the clock signals CLK1 and CLK2, and the disk information of the magneto-optical disk 61 sent from the identification data reproducing circuit 64. Then, on the basis of the disk information, the clock selecting circuit 67 selects one of the two clock signals and outputs it to the A/D converter 68.

The A/D converter 68 (digital signal output section; digital signal producing section) receives the analog reproducing signal c and the clock signal sent from the clock selecting circuit 67. Then, on the basis of the timing of the clock signal, the A/D converter 68 converts the analog reproducing signal c into digital reproducing signals, and outputs these digital reproducing signals. In what follows, the digital signals outputted by the A/D converter 68 will be referred to as the "digital reproducing signals."

The PRML demodulating circuit 69 (demodulation section) receives the digital reproducing signals, and demodulates these digital reproducing signals using the PRML (Partial Response Maximum Likelihood) demodulation method, thus producing binarized data.

The amplitude ratio detecting circuit 70 (reproducing power control section) receives the digital reproducing signals, and, based on the digital reproducing signals corresponding to the short mark recording domain 93 and the long mark recording domain 94 of a single sector 92, calculates (detects) and outputs, by means of a method to be discussed below, a ratio between the amplitudes of the short and long marks (equivalent to reproducing signal quantity; hereinafter "mean amplitude ratio").

The differential amplifier 71 (reproducing power control section) compares the mean amplitude ratio received from the amplitude ratio detecting circuit 70 with a standard value received from a standard value producing circuit (not shown), and outputs the result of this comparison (the difference of the mean amplitude ratio and the standard value).

The reproducing power control circuit 72 (reproducing power control section) supplies driving current to the semiconductor laser 82, and, by controlling the amperage of the driving current, controls the reproducing power of the semiconductor laser 82. The reproducing power control circuit 72 receives the result of comparison from the differential amplifier 71, and controls the driving current supplied to the semiconductor laser 82 so as to reduce the absolute value of this comparison result.

Next, selection of the clock signal by the clock selecting circuit 67 will be explained.

On the basis of the disk information received from the identification data reproducing circuit 64, the clock selecting circuit 67 selects and outputs to the A/D converter 68 the clock signal most suited to sampling of the analog reproducing signal c.

In other words, when the analog reproducing signal is a signal corresponding to the digital data, the clock selecting circuit 67 selects and outputs the clock signal most suited to sampling based on the combination of the modulation method of the digital data and PRML demodulation in the PRML demodulating circuit 69.

Again, when the analog reproducing signal c is a signal corresponding to recorded marks for reproducing power control, the clock selecting circuit 67 selects and outputs the clock signal most suited to sampling based on the characteristics of the recorded marks, such as the mark lengths of the short and long marks, the intervals therebetween, etc.

Figure 24:
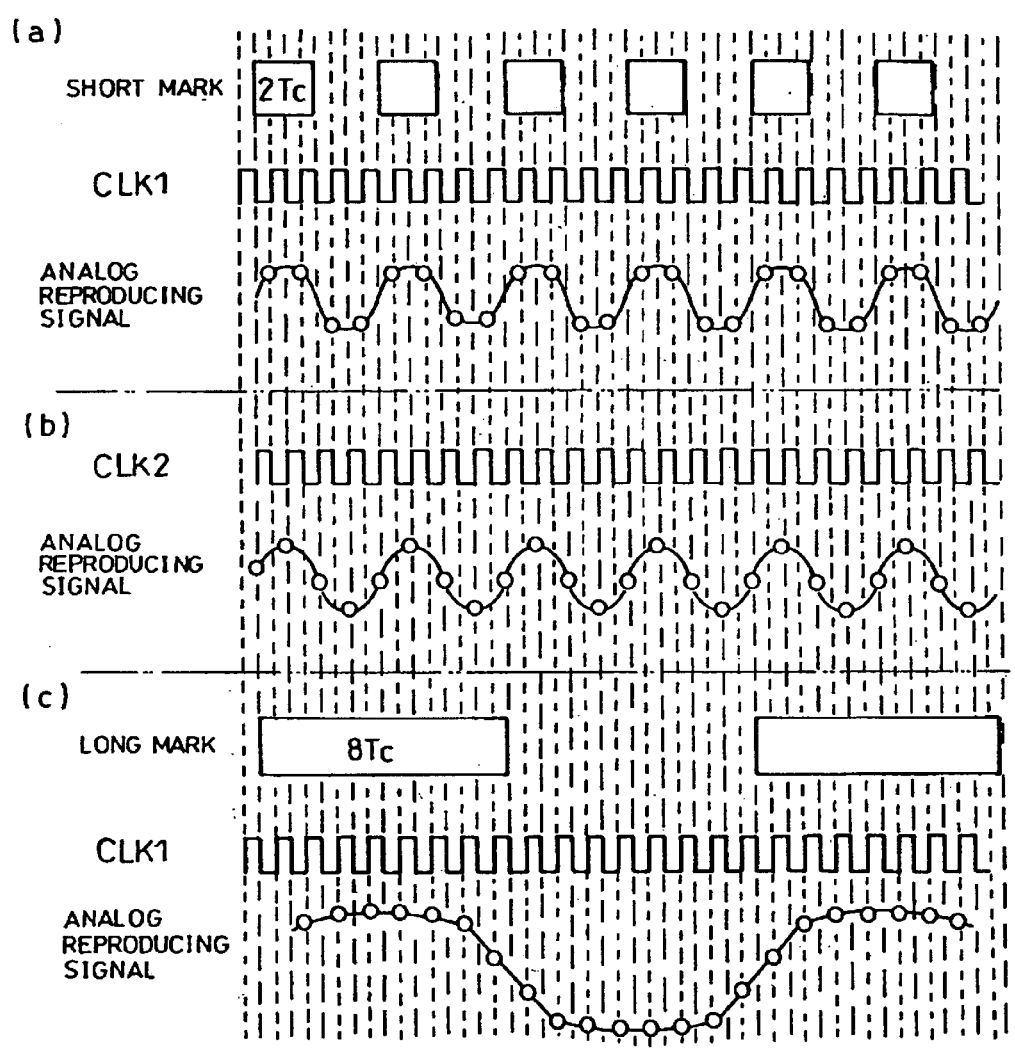
FIG. 24 is an explanatory drawing showing the relationship between the foregoing clock signals and analog reproducing signals corresponding to the foregoing short marks and long marks, which are sampled in accordance with the clock signals.

FIG. 24 is an explanatory drawing showing the relationship between the clock signals CLK1 and CLK2 and analog reproducing signals corresponding to the short marks and the long marks, which are sampled in accordance with the clock signals. In other words, in FIG. 24, (a) shows sampling points when an analog reproducing signal c made up of short marks is sampled based on the clock signal CLK1. Again, (b) shows sampling points when an analog reproducing signal c made up of short marks is sampled based on the clock signal CLK2. Again, (c) shows sampling points when an analog reproducing signal c made up of long marks is sampled based on the clock signal CLK1. In the Figure, sampling points of each analog reproducing signal, determined based on each clock signal, are shown by "o."

As shown in FIG. 24 at (a), the clock signal CLK1 has a phase suited to demodulating using PR(1,2,1)ML demodulation.

The pattern of recorded marks formed in the short mark recording domain 93 is a pattern of repeated short marks 2Tc in length, as shown in FIG. 22. For purposes of reproducing power control, it is preferable if the analog reproducing signal c corresponding to these short marks is sampled at upper and lower peak points.

Accordingly, as shown in FIG. 24 at (a), if the clock signal CLK1 is used, it is difficult to sample the upper and lower peak points of this analog reproducing signal c.

If, on the other hand, as shown in FIG. 24 at (b), the clock signal CLK2 is used, it is easy to sample the upper and lower peak points of this analog reproducing signal c. Accordingly, sampling of an analog reproducing signal c corresponding to short marks should preferably be performed based on the clock signal CLK2 rather than the clock signal CLK1.

Again, as shown in FIG. 22, the pattern of recorded marks formed in the long mark recording domain 94 is a pattern of repeated long marks 8Tc in length. For purposes of reproducing power control, it is preferable if the analog reproducing signal c corresponding to these long marks is sampled at as many upper and lower envelope points as possible. Accordingly, as shown in FIG. 24 at (c), sampling of an analog reproducing signal c corresponding to long marks should preferably be performed based on the clock signal CLK1 rather than the clock signal CLK2.

Accordingly, if the analog reproducing signal c is a signal corresponding to digital data or to long marks, the clock selecting circuit 67 outputs the clock signal CLK1 to the A/D converter 68. If the analog reproducing signal c is a signal corresponding to short marks, on the other hand, the clock selecting circuit 67 outputs the clock signal CLK2 to the A/D converter 68.

The following will explain the operations of the present reproducing device when reproducing the magneto-optical disk 61.

During reproducing, reproducing begins with the identification data recording domain 96 of the sector 92 In other words, the light beam a projected by the semiconductor laser 82 is first projected, at a predetermined initial reproducing power, onto the identification data recording domain 96. This initial reproducing power is as follows. When the reproducing power control circuit 72 is not receiving a feedback signal from the differential amplifier 71, the reproducing power control circuit 72 supplies a previously set initial driving current to the semiconductor laser 82. In other words, the initial reproducing power of the semiconductor laser 82 is a reproducing power obtained in accordance with the initial driving current.

When the light beam a from the semiconductor laser 82 is projected onto the identification data recording domain 96 of the magneto-optical disk 61, reflected light b reflected from the identification data recording domain 96 is received by the photodiode 83, which produces an analog reproducing signal c. This analog reproducing signal c is sent to the identification data reproducing circuit 64, the first clock producing circuit 65, the second clock producing circuit 66, and the A/D converter 68.

Upon receiving the analog reproducing signal c, the identification data reproducing circuit 64 obtains, based on this signal, the modulation method identification data and the control mark identification data of the magneto-optical disk 61. The identification data reproducing circuit 64 then identifies, from the two kinds of identification data, the type of modulation method and the characteristics of the recorded marks for reproducing power control, and sends these, as the disk information, to the clock selecting circuit 67.

In other words, the identification data reproducing circuit 64 recognizes and informs the clock selecting circuit 67 that the modulation method of the digital data recorded in the data recording domain 95 of the magneto-optical disk 61 is (1,7)RLL modulation; that a pattern of short marks 2Tc in length repeated at an interval of 2Tc is formed in the short mark recording domain 93; and that a pattern of long marks 8Tc in length repeated at an interval of 8Tc is formed in the long mark recording domain 94.

After reproducing of the identification data recording domain 96, the light beam a, still projected by the semiconductor laser 82 at the predetermined initial reproducing power, is projected onto the short mark recording domain 93 and the long mark recording domain 94. Then, as with reproducing of the identification data recording domain 96, an analog reproducing signal c corresponding to the short marks or the long marks is produced and sent to the identification data reproducing circuit 64, the first clock producing circuit 65, the second clock producing circuit 66, and the A/D converter 68.

Upon receiving the analog reproducing signal c corresponding to the short marks or the long marks, the first clock producing circuit 65 produces and outputs to the clock selecting circuit 67 the clock signal CLK1 synchronized with the bit frequency of the analog reproducing signal c. In the same way, the second clock producing circuit 66 produces and outputs to the clock selecting circuit 67 the clock signal CLK2 synchronized with the bit frequency of the analog reproducing signal c. As shown in FIG. 23, the phases of these two clock signals are offset one-half cycle with respect to each other.

The clock selecting circuit 67, based on the disk information sent from the identification data reproducing circuit 64 at the time of reproducing of the identification data recording domain 96, selects and outputs to the A/D converter 68 one of the two clock signals CLK1 and CLK2.

The A/D converter 68 samples the analog reproducing signal c based on the clock signal received from the clock selecting circuit 67, and produces digital reproducing signals, which are sent to the PRML demodulating circuit 69 and the amplitude ratio detecting circuit 70.

After receiving digital reproducing signals corresponding to the short marks and the long marks, the amplitude ratio detecting circuit 70, based on these digital reproducing signals, calculates and outputs to the differential amplifier 71 a mean amplitude ratio. Sampling of the analog reproducing signals c corresponding to the long marks and the short marks by the A/D converter 68, and calculation of the mean amplitude ratio by the amplitude ratio detecting circuit 70, will be discussed later.

Upon receiving the mean amplitude ratio from the amplitude ratio detecting circuit 70, the differential amplifier 71 compares the mean amplitude ratio with a standard value (an ideal value for the amplitude ratio), and outputs the result of this comparison (the difference of the mean amplitude ratio and the standard value) to the reproducing power control circuit 72. The reproducing power control circuit 72 then controls the driving current supplied to the semiconductor laser 82 in such a way that feedback reduces the absolute value of this comparison result. By this means, the semiconductor laser 82 projects the light beam a at an optimum reproducing power.

After the short mark recording domain 93 and the long mark recording domain 94 have been reproduced, the light beam a, now projected by the semiconductor laser 82 at an optimum reproducing power, is projected onto the data recording domain 95. Then, as with reproducing of the short mark recording domain 93 and the long mark recording domain 94, an analog reproducing signal c corresponding to the digital data is sent to the first clock producing circuit 65, the second clock producing circuit 66, and the A/D converter 68, and the clock signals CLK1 and CLK2 are sent to the clock selecting circuit 67.

Then, the clock selecting circuit 67, based on the disk information, outputs to the A/D converter 68 the clock signal CLK1, which is suited to sampling of an analog reproducing signal c corresponding to digital data. The AID converter 68, based on the clock signal CLK1, samples the analog reproducing signal c corresponding to the digital data, and produces digital reproducing signals, which are sent to the PRML demodulating circuit 69 and the amplitude ratio detecting circuit 70.

In the PRML demodulating circuit 69, the digital reproducing signals corresponding to the data recording domain 95 are equalized into PR(1,2,1) characteristics, and decoded into the most likely data by means of Viterbi decoding, thus producing binarized data. The PRML demodulating circuit then outputs this binarized data to a binarized data processing device (not shown).

When reproducing of the data recording domain 95 is completed, thus completing reproducing of a single sector 92, another sector 92 adjacent thereto is reproduced in the same way.

Figure 25:
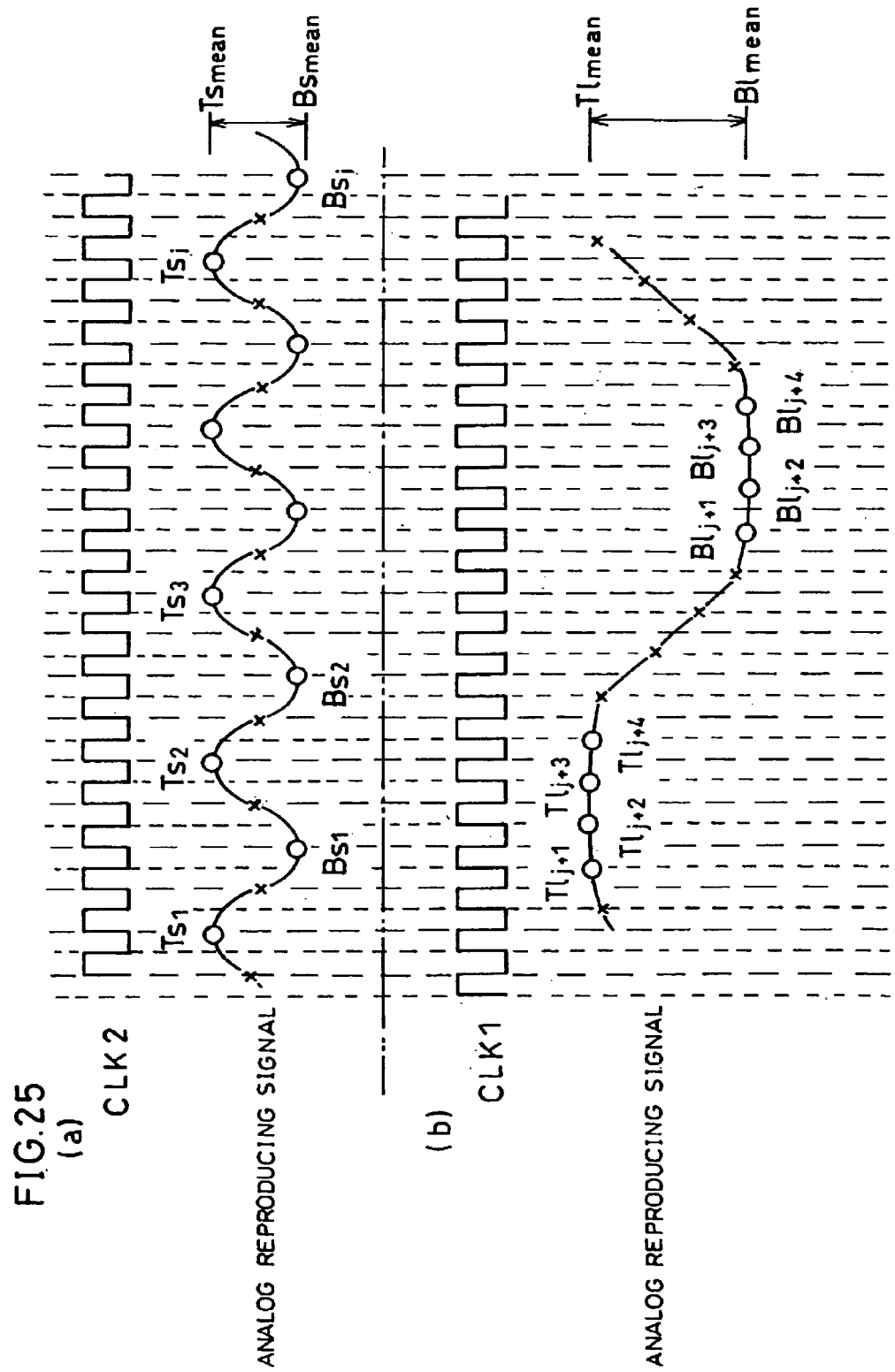
FIG. 25 is an explanatory drawing showing, in the optical reproducing device shown in FIG. 19, sampling by an A/D converter of an analog reproducing signal corresponding to short marks, and of an analog reproducing signal corresponding to long marks.

The following will explain calculation of the mean amplitude ratio by the amplitude ratio detecting circuit 70. In FIG. 25, (a) shows sampling by the A/D converter 68 of an analog reproducing signal c corresponding to short marks, and (b) shows sampling of an analog reproducing signal c corresponding to long marks.

As shown in FIG. 25 at (a), on the basis of the clock signal CLK2, the A/D converter 68 samples the analog reproducing signal c corresponding to short marks at an upper peak point ($Ts_i$), an intermediate point (shown in the Figure as "x"), a lower peak point ($Bs_i$), and an intermediate point (i being a natural number). The digital reproducing signals obtained by sampling are sent in order to the amplitude detecting circuit 70.

Then, the amplitude detecting circuit 70 calculates from the digital reproducing signal values obtained from a predetermined number of samples of $Ts_i$ a mean value $Ts_{mean}$ (a mean value for the upper peak points). In other words, the amplitude detecting circuit 70 calculates the mean value $Ts_{mean}$ by finding the sum of the digital reproducing signal values obtained from a predetermined number of samples of $Ts_i$, and then dividing the sum by that predetermined number.

Next, in the same way, the amplitude detecting circuit 70 calculates from the digital reproducing signal values obtained from a predetermined number of samples of $Bs_i$ a mean value $Bs_{mean}$ (a mean value for the lower peak points). Here, the number of samples of $Ts_i$ and of $Bs_i$ used in calculating the mean values $Ts_{mean}$ and $Bs_{mean}$ are equal. The amplitude detecting circuit 70 then calculates the difference between these two mean values ($Ts_{mean}-Bs_{mean}$), and treats this value as the mean amplitude value for the short marks.

Again, as shown in FIG. 25 at (b), on the basis of the clock signal CLK1, the A/D converter 68 samples the analog reproducing signal c corresponding to long marks at four upper envelope points ($Tl_{j+1}$, $Tl_{j+2}$, $Tl_{j+3}$, and $Tl_{j+4}$), four intermediate points (shown in the Figure as "x"), four lower envelope points ($Bl_{j+1}$, $Bl_{j+2}$, $Bl_{j+3}$, and $Bl_{j+4}$), and four intermediate points (j being a multiple of 4). The digital reproducing signals obtained by sampling are sent in order to the amplitude detecting circuit 70.

Then, the amplitude detecting circuit 70 calculates from the digital reproducing signal values obtained from a predetermined number of samples of $Tl_{j+k}$ (with k=1 to 4) a mean value $Tl_{mean}$ (a mean value for the upper envelope points). In other words, the amplitude detecting circuit 70 calculates the mean value $Tl_{mean}$ by finding the sum of the digital reproducing signal values obtained from a predetermined number of samples of $Tl_{j+k}$, and then dividing the sum by that predetermined number.

Next, in the same way, the amplitude detecting circuit 70 calculates from the digital reproducing signal values obtained from a predetermined number of samples of $Bl_{j+k}$ (with k=1 to 4) a mean value $Bl_{mean}$ (a mean value for the lower envelope points). Here, the number of samples of $Tl_{j+k}$ and of $Bl_{j+k}$ used in calculating the mean values $Tl_{mean}$ and $Bl_{mean}$ are equal. The amplitude detecting circuit 70 then calculates the difference between these two mean values ($Tl_{mean}-Bl_{mean}$), and treats this value as the mean amplitude value for the long marks.

Then the amplitude ratio detecting circuit 70 calculates a ratio between the mean amplitude values for the short marks and the long marks ($Ts_{mean}-Bs_{mean}$)/($Tl_{mean}-Bl_{mean}$) as the mean amplitude ratio.

As discussed above, the magneto-optical disk 61 to be reproduced by the present reproducing device is provided with identification data recording domains 96, in which are recorded in advance the modulation method identification data and the control mark identification data.

Then the identification data reproducing circuit 64 of the present reproducing device obtains the modulation method identification data and the control mark identification data, identifies the modulation method of the digital data and the characteristics of the recorded marks for reproducing power control, and sends these to the clock selecting circuit 67 as the disk information. Further, the clock selecting circuit 67 also receives clock signals CLK1 and CLK2, which are clock signals of different phase.

Then, based on the disk information, the clock selecting circuit 67 outputs to the A/D converter 68 either the clock signal CLK1 or the clock signal CLK2. In other words, the clock selecting circuit 67 selects and outputs to the A/D converter the clock signal most suited to A/D conversion of the analog reproducing signal c, based on the type thereof.

Accordingly, the sampling performed by the A/D converter 68 is performed at a sampling frequency suited to the analog reproducing signal c inputted. In other words, analog reproducing signals c corresponding to the digital data and to the recorded marks for reproducing power control are sampled at an optimum phase, as shown in FIG. 24 at (a) through (c).

By this means, the PRML demodulating circuit 69 is enabled to perform good PRML demodulating. Accordingly, with the present reproducing device, the magneto-optical disk 61 recorded by PRML modulation can be reproduced with a low error rate.

Again, in the same way, the amplitude ratio detecting circuit 70 is able to correctly detect the peak values or envelope values of analog reproducing signals c corresponding to the recorded marks for reproducing power control, and to calculate a mean amplitude ratio (the reproducing signal quantity). Accordingly, with the present reproducing device, it is possible to accurately control the reproducing power of the semiconductor laser 82, i.e., the quantity of light of the semiconductor laser 82.

In this way, with the present reproducing device, even if the optimum clock signal for reproducing the digital data (which is determined by the combination of the modulation method of the digital data and the demodulation method) differs from the optimum clock signal for reproducing the recorded marks for reproducing power control (which is determined by the type of recorded marks for reproducing power control), all of the digital data and recorded marks for reproducing power control can be reproduced based on an optimum clock signal.

Again, with the present reproducing device, a single A/D converter 68 sends digital reproducing signals to both the amplitude ratio detecting circuit 70 and the PRML demodulating circuit 69. In other words, a single A/D converter sends digital reproducing signals to circuits which perform two different kinds of processing. Accordingly, the present reproducing device can be realized by means of a simple structure.

Further, in the present reproducing device, reproducing power control of the semiconductor laser 82 is performed each time reproducing of a sector is begun. Accordingly, reproducing power control is performed at short time intervals. Accordingly, even if the environment in which the present reproducing device is placed changes in a short time, causing the optimum reproducing power of the semiconductor laser 82 to fluctuate in a short time, the reproducing power of the semiconductor laser 82 can always be controlled to an optimum level. In other words, with the present reproducing device, control of the reproducing power of the semiconductor laser 82 can respond to rapid fluctuations in the optimum reproducing power.

The following will discuss the reasons why the sampling of the short marks by the clock signal CLK1 shown in FIG. 24 at (a) is suited to demodulation using the PR(1,2,1)ML demodulation method.

Figure 33:
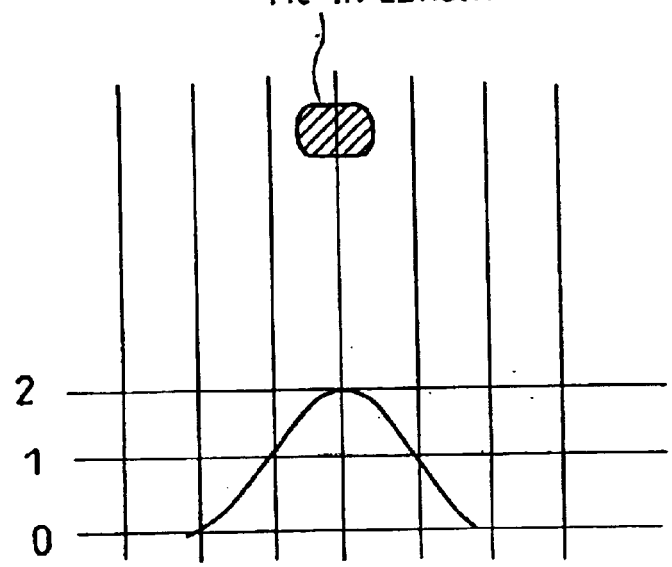
FIG. 33 is an explanatory drawing showing the waveform of a reproducing signal corresponding to recorded marks 1Tc in length.
Figure 34:
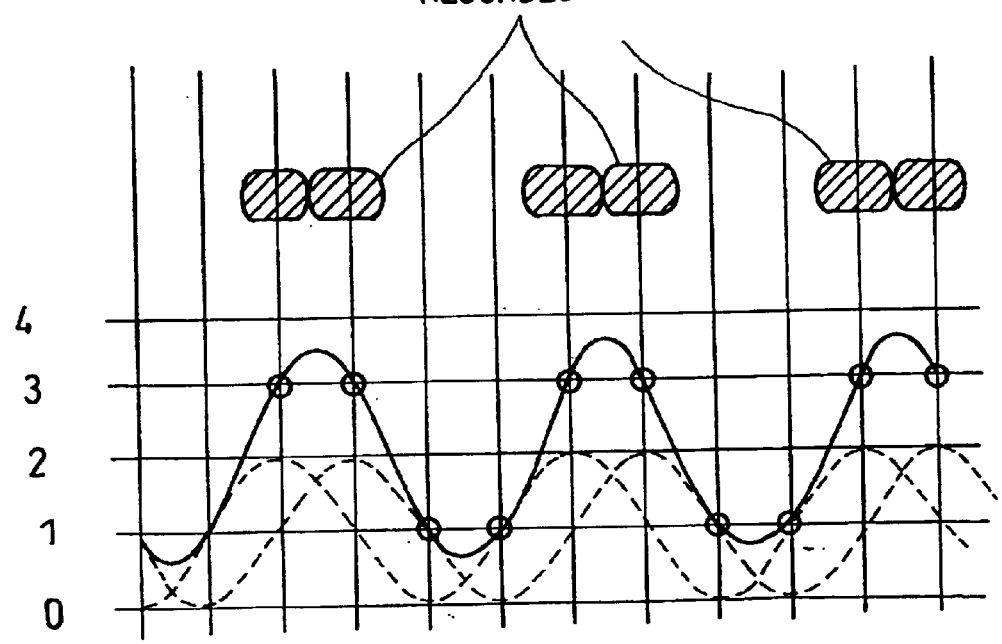
FIG. 34 is an explanatory drawing showing the waveform of a reproducing signal corresponding to a pattern of repeated recorded marks 2Tc in length.

With the PR(1,2,1)ML demodulation method, a better error rate can be obtained the closer a solitary wave-form (1Tc) is to PR(1,2,1) characteristics. These PR(1,2,1) characteristics are characteristics in which, as shown in FIG. 33, level ratios for samplings at each channel lock cycle are . . . , 0, 1, 2, 1, 0, . . . . Further, since a reproducing signal corresponding to a pattern of repeated recorded marks 2Tc in length is a superimposition of these solitary wave-forms, it has a wave-form like that shown in FIG. 34. Accordingly, when sampling a reproducing signal corresponding to this pattern, a clock signal which samples points at the shoulder of the reproducing signal, as shown in FIG. 24 at (a), is optimum.

In the present embodiment, the modulation method of the digital data in the magneto-optical disk 61 is (1,7)RLL modulation, and the method of PRML demodulation by the PRML demodulating circuit 69 is PR(1,2,1)ML demodulation. However, the digital data modulation method able to be reproduced by the present reproducing device is not limited to (1,7)RLL modulation, and any modulation method may be used. Further, the method of demodulation by the PRML demodulating circuit 69 is not limited to PR(1,2,1)ML demodulation, and any type of PRML demodulation may be used.

Again, in the present embodiment, the data recorded in the identification data recording domains 96 of the magneto-optical disk 61 is of two types, modulation method identification data and control mark identification data, but the recorded data is not limited to these. The data recorded in the identification data recording domains 96 and sent to the clock selecting circuit 67 may also be data such as the following.

When the magneto-optical disk 61 records several types of digital information (including the digital data and the recorded marks for reproducing power control), and the clock signal most suited to reproducing the digital information differs according to the type of digital information, the identification data recording domains 96 may record data specifying the clock signal most suited to reproducing of each type of digital information, the location of each type of digital information in each sector, etc. If this type of magneto-optical disk 61 is used, the present reproducing device is enabled to perform reproducing of each type of digital information on the basis of an optimum clock signal.

Further, in the present embodiment, the magneto-optical disk 61 is provided with identification data recording domains 96, in which are recorded the modulation method identification data and the control mark identification data. Then the identification data reproducing circuit 64 of the present reproducing device obtains the modulation method identification data and the control mark identification data, and, based on this identification data, sends the disk information to the clock selecting circuit 67. However, the structure of the present reproducing device and of the magneto-optical disk 61 need not be limited to the respective structures discussed above.

In other words, the present reproducing device may be structured so that the analog reproducing signal c is sent to the clock selecting circuit 67, which identifies the type of the analog reproducing signal c by analyzing With this structure, the clock selecting circuit 67 outputs one of the two clock signals to the A/D converter 68 on the basis of the identified type of the analog reproducing signal c. Further, with this structure, the magneto-optical disk 61 need not be provided with the identification data recording domains 96.

Again, in the present reproducing device, the phases of the clock signals CLK1 and CLK2 are offset by one-half cycle, but the clock signals to be sent to the clock selecting circuit 67 need not be limited to these. In other words, it is satisfactory if the clock signals sent to the clock selecting circuit 67 are optimum for reproducing of the digital data and recorded marks for reproducing power control recorded in the magneto-optical disk 61.

Again, in the present embodiment, the short marks recorded in the magneto-optical disk 61 are marks which are best reproduced using the clock signal CLK2, and the long marks are marks which are best reproduced using the clock signal CLK1, but the recorded marks for reproducing power control recorded in the magneto-optical disk 61 are not limited to these.

For example, the long marks may be marks which are best reproduced by the clock signal CLK2. In other words, both the long marks and short marks for reproducing power control may be marks which are best reproduced using the clock signal CLK2.

When reproducing a magneto-optical disk 61 with this kind of structure, the first clock producing circuit 65 of the present reproducing device is a circuit for producing the clock signal for reproducing of the digital data, and the second clock producing circuit 66 is a circuit for producing the clock signal for reproducing of the recorded marks for reproducing power control.

With this structure, even if, for example, the first clock producing circuit 65 is unable to output a normal clock signal CLK1 due to unlocking of the PLL, etc., this will have no influence on reproducing power control by the amplitude ratio detecting circuit 70, the differential amplifier 71, and the reproducing power control circuit 72. Accordingly, even in the event of malfunctions in the first clock producing circuit 65, normal reproducing power control can be continued.

Again, in the present reproducing device, the clock signals sent to the clock selecting circuit 67 are of two types, CLK1 and CLK2, but the number of clock signals sent to the clock selecting circuit 67 is not limited to two.

As many clock signals as necessary in optimum reproducing of the digital data and the recorded marks for reproducing power control may be sent to the clock selecting circuit 67.

Again, in the present embodiment, the magneto-optical disk 61 has a structure in which the identification data recording domain 96 is provided as a separate domain in the sector 92. However, the identification data recording domain 96 may be provided within the short mark recording domain 93, within the long mark recording domain 94, or within another domain. Again, instead of providing an identification data recording domain 96 for each sector 92, one identification data recording domain 96 may be provided for each recording track 91, or for each magneto-optical disk 61.

In addition, the magneto-optical disk 61 may be a conventional magnetic ultra high resolution optical memory medium provided with a reproducing layer and a recording layer, from which data recorded in the recording layer is reproduced by forming on the reproducing layer an aperture smaller in diameter than the light spot of the semiconductor laser 82.

Further, the PRML demodulating circuit 69 of the present reproducing device may have a structure equivalent to that of the conventional PRML demodulating circuit 26.

Again, the present reproducing device may have a structure in which, prior to reproducing of the digital data or the recorded marks for reproducing power control, the identification data reproducing circuit 64 reproduces the modulation method identification data and the control mark identification data recorded in the identification data recording domain 96, and recognizes in advance that the modulation method of the digital data is (1,7)RLL modulation, and that the recorded marks for reproducing power control are made up of a pattern of repeated short marks 2Tc in length and a pattern of repeated long marks 8Tc in length.

In addition, in the present reproducing device, the amplitude ratio detecting circuit 70 calculates the mean amplitude ratio, but the structure of the present reproducing device is not limited to this. For example, instead of the amplitude ratio detecting circuit 70, the present reproducing device may be provided with the short mark level detecting circuit 6, the long mark level detecting circuit 7, and the division circuit 9 described in the first embodiment above.

Further, the short marks, long marks, and disk information of the magneto-optical disk 61 need not be formed in advance in the short mark recording domain 93, the long mark recording domain 94, and the identification data recording domain 96. It is sufficient if the magneto-optical disk 61 is provided with domains of a predetermined size for forming of the short marks, long marks, and disk information. Then, prior to reproducing, the user's desired recorded marks for reproducing power control and disk information may be recorded in these domains 93, 94, and 96.

[Third Embodiment]

The following will explain the third embodiment of the present invention. Members having functions equivalent to those of the second embodiment above will be given the same reference symbols, and explanation thereof will be omitted.

Figure 26:
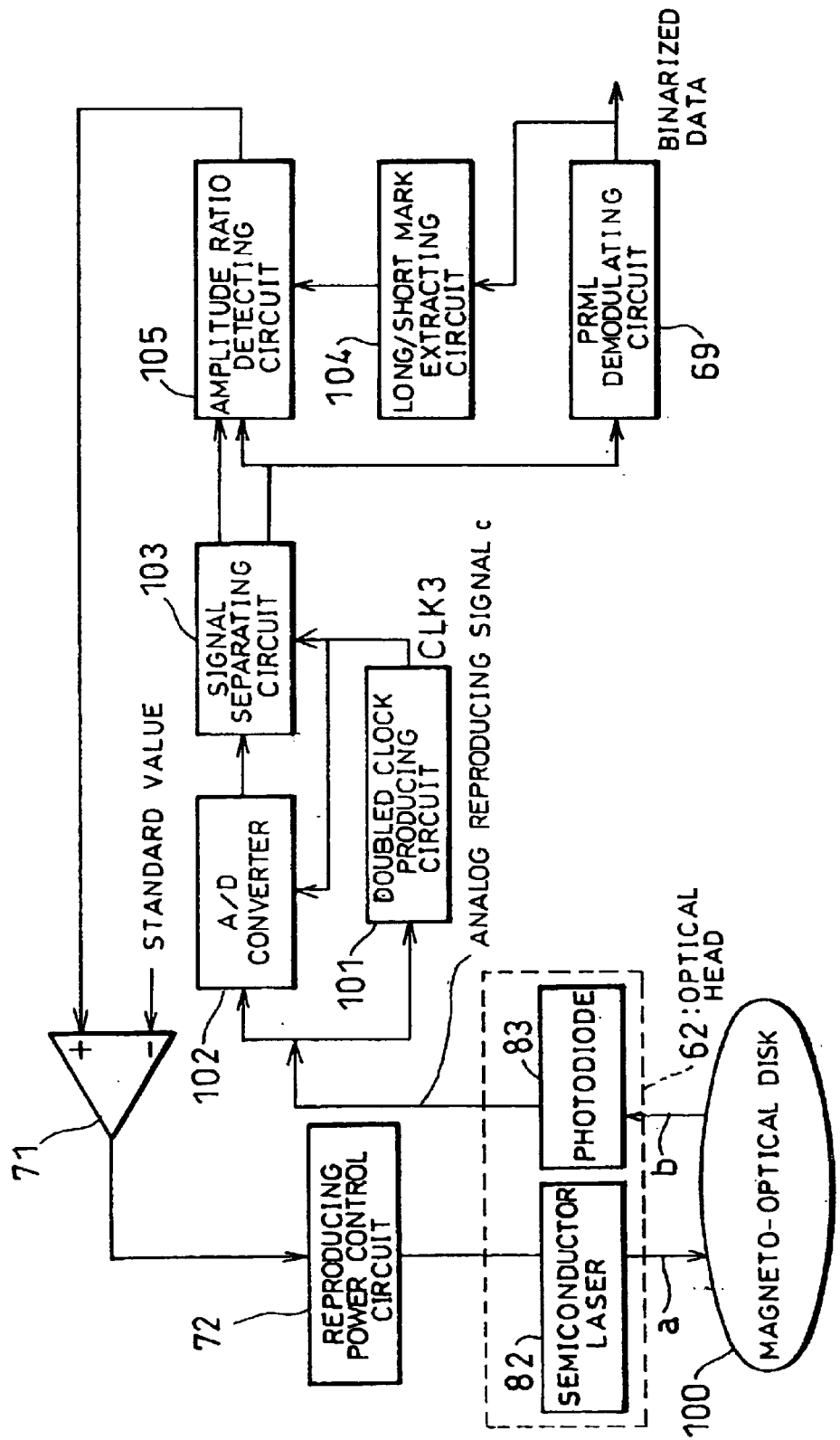
FIG. 26 is an explanatory drawing showing the structure of an optical reproducing device according to the third embodiment of the present invention.

FIG. 26 is an explanatory drawing showing the structure of an optical reproducing device according to the present embodiment (hereinafter the "present reproducing device"). As shown in the Figure, instead of the identification data reproducing circuit 64, the first clock producing circuit 65, the second clock producing circuit 66, the clock selecting circuit 67, the A/D converter 68, and the amplitude ratio detecting circuit 70 of the optical reproducing device according to the second embodiment above, the present reproducing device is provided with a doubled clock producing circuit 101, an A/D converter 102, a signal separating circuit 103, a long/short mark extracting circuit 104, and an amplitude ratio detecting circuit 105.

Further, the magneto-optical disk 100 shown in FIG. 26 is an optical memory medium to be reproduced by the present reproducing device. The magneto-optical disk 100 is not provided with the short mark recording domain 93, the long mark recording domain 94, and the identification data recording domain 96 of the magneto-optical disk 61 according to the second embodiment above. In other words, the recorded marks for reproducing power control, made up of the short and long marks, are not recorded in the magneto-optical disk 100, in which only the user's desired data is recorded as digital data.

Based on the analog reproducing signal c received from the photodiode 83, the doubled clock producing circuit 101 (digital signal output section; clock signal output section) produces and outputs a clock signal CLK3 with a frequency double the bit frequency (the reproducing bit frequency).

Figure 27:
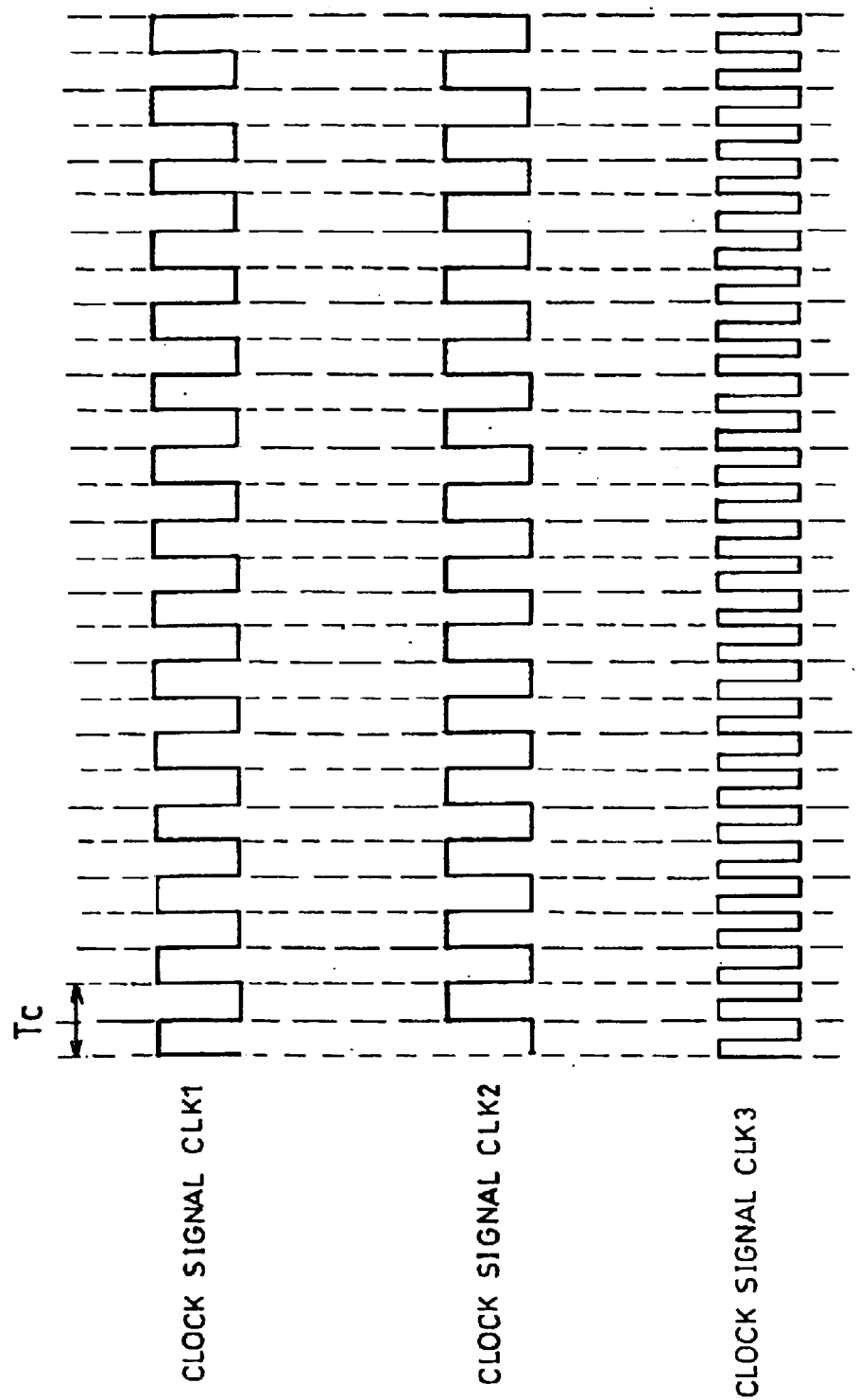
FIG. 27 is an explanatory drawing for comparing a clock signal produced by a doubled clock producing circuit in the optical reproducing device shown in FIG. 26 with the clock signals shown in FIG. 23.

FIG. 27 is an explanatory drawing comparing the clock signal CLK3 with the clock signals CLK1 and CLK2 shown in FIG. 23. As shown in FIG. 27, the clock signal CLK3 is a clock signal with a frequency double that of the clock signals CLK1 and CLK2. Accordingly, the clock signal CLK3 is a clock signal which includes both a phase suited to PR(1,2,1)ML demodulation and to detecting of upper and lower envelope points of the long marks shown in FIG. 22, and a phase suited to detecting of upper and lower peak points of the short marks shown in FIG. 22.

On the basis of the timing of the clock signal CLK3, the A/D converter 102 (digital signal output section; digital signal producing section) converts the analog reproducing signal c into digital reproducing signals, and outputs these digital reproducing signals. In what follows, the digital signals outputted by the A/D converter 102 will be referred to as the "digital reproducing signals."

The signal separating circuit 103 (digital signal output section; digital signal separating section) receives the digital reproducing signals, and, based on the timing of the clock signal CLK3, assigns each digital reproducing signal value alternately to one of two signals, and outputs these two signals.

The long/short mark extracting circuit 104 (reproducing power control section; timing detecting section) receives binarized data from the PRML demodulating circuit 69, and extracts therefrom only binarized data corresponding to recorded marks 2Tc in length and recorded marks 8Tc in length.

The following will explain the operations of the present reproducing device when reproducing the magneto-optical disk 100. The operations through producing of an analog reproducing signal c from the magneto-optical disk 100 are equivalent to those of the optical reproducing device according to the second embodiment above, and explanation thereof will be omitted.

In the present reproducing device, the analog reproducing signal c outputted by the photodiode 83 is sent to the doubled clock producing circuit 101 and the A/D converter 102. As mentioned above, since there are no recorded marks for reproducing power control recorded in the magneto-optical disk 100, the analog reproducing signal c outputted by the photodiode 83 is always one corresponding to digital data.

Based on the analog reproducing signal c inputted thereto, the doubled clock producing circuit 101 produces a clock signal CLK3 having a frequency double the bit frequency of the analog reproducing signal c, and outputs the clock signal CLK3 to the A/D converter 102 and the signal separating circuit 103. The A/D converter 102 samples the analog reproducing signal c based on the clock signal CLK3, thus producing digital reproducing signals, which are sent to the signal separating circuit 103.

Figure 28:
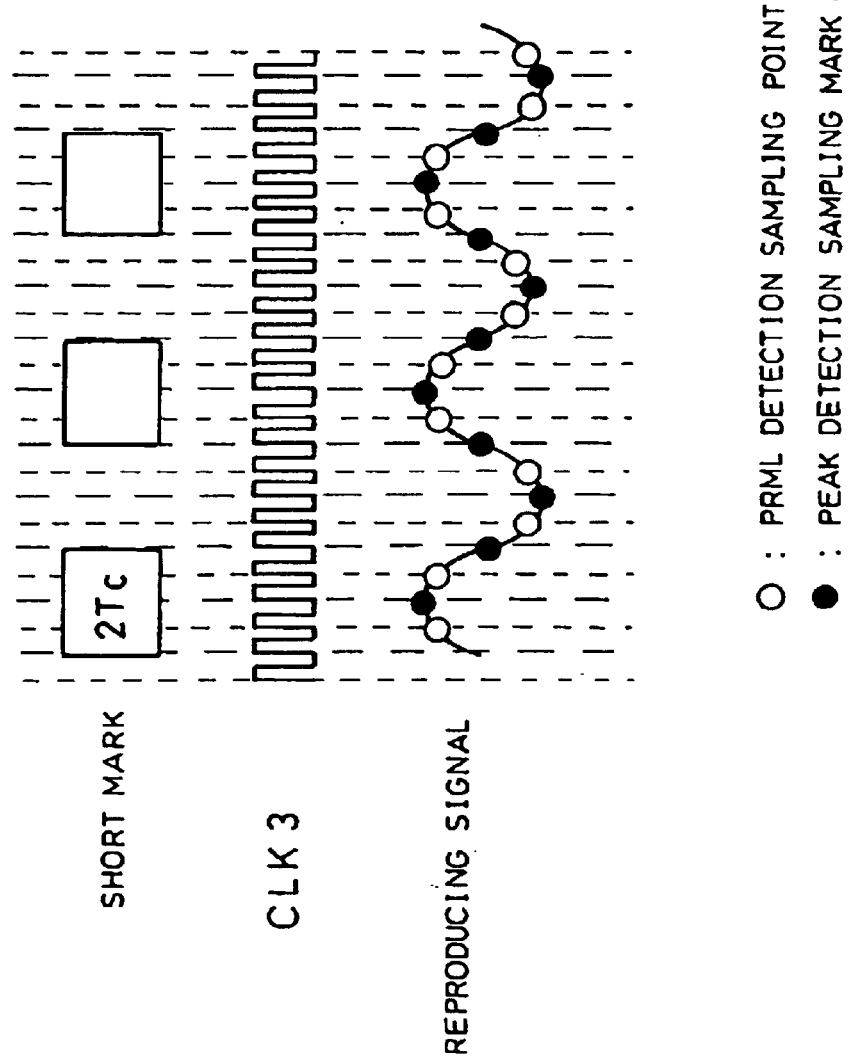
FIG. 28 is an explanatory drawing showing production of digital reproducing signals by an A/D converter in the optical reproducing device shown in FIG. 26, when an analog reproducing signal corresponding to recorded marks with a mark length of 2Tc is inputted.

FIG. 28 is an explanatory drawing explaining the production of digital reproducing signals by the A/D converter 102 when it receives an analog reproducing signal c corresponding to recorded marks 2Tc in length (equivalent to the short marks). In the Figure, "○" and "●" indicate the points sampled by the A/D converter 102 based on the clock signal CLK3.

As shown in the Figure, the A/D converter 102, based on the clock signal CLK3, alternately samples sampling points shown by "○," which are suited to PRML detecting (and to recorded marks 8Tc in length) and sampling points shown by "●," which are suited to detecting a peak value of recorded marks 2Tc in length.

Figure 29:
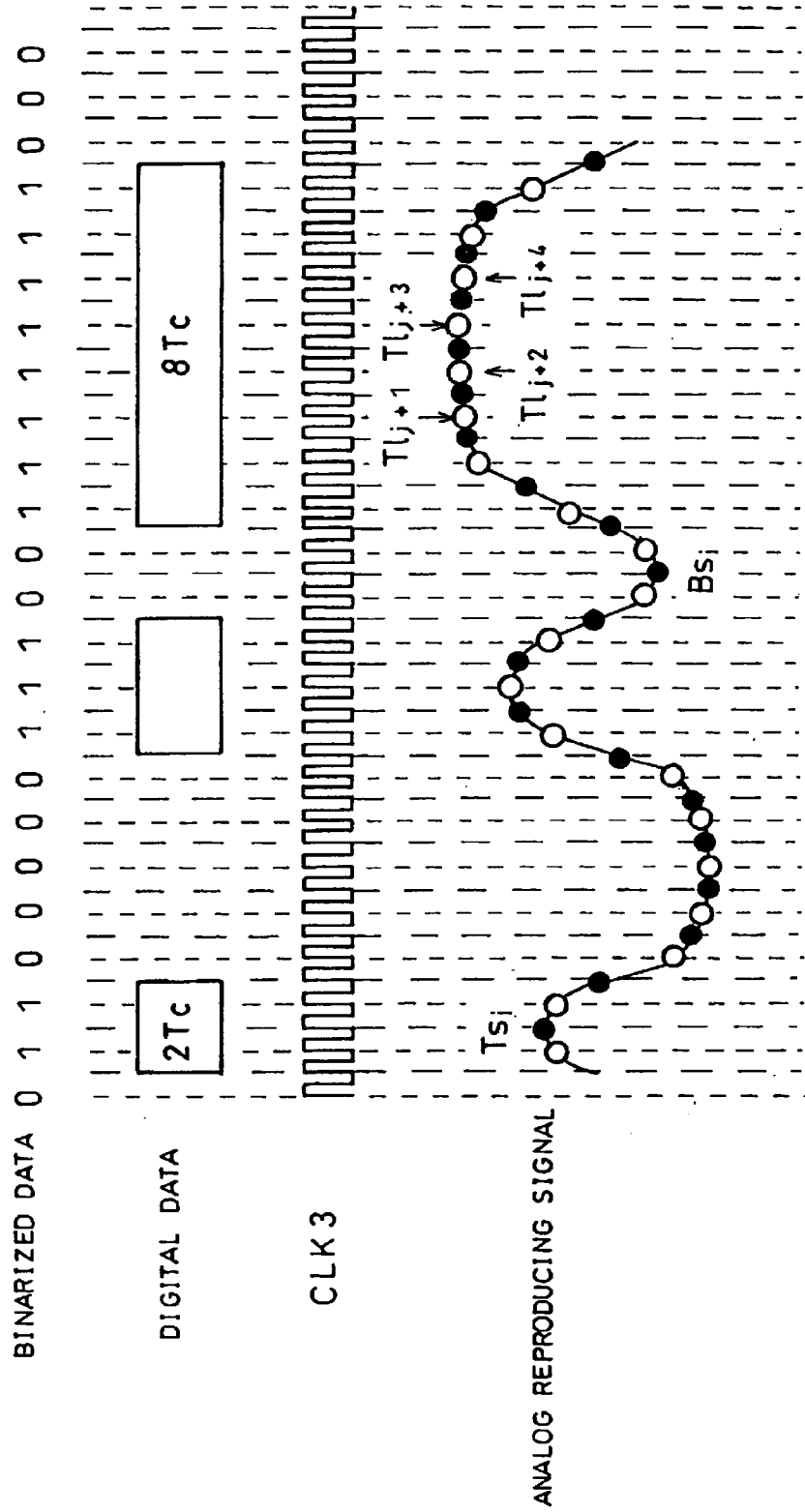
FIG. 29 is an explanatory drawing showing production of digital reproducing signals by the foregoing A/D converter, when reproducing digital data made up of a random pattern of recorded marks of various mark lengths.
Figure 30:
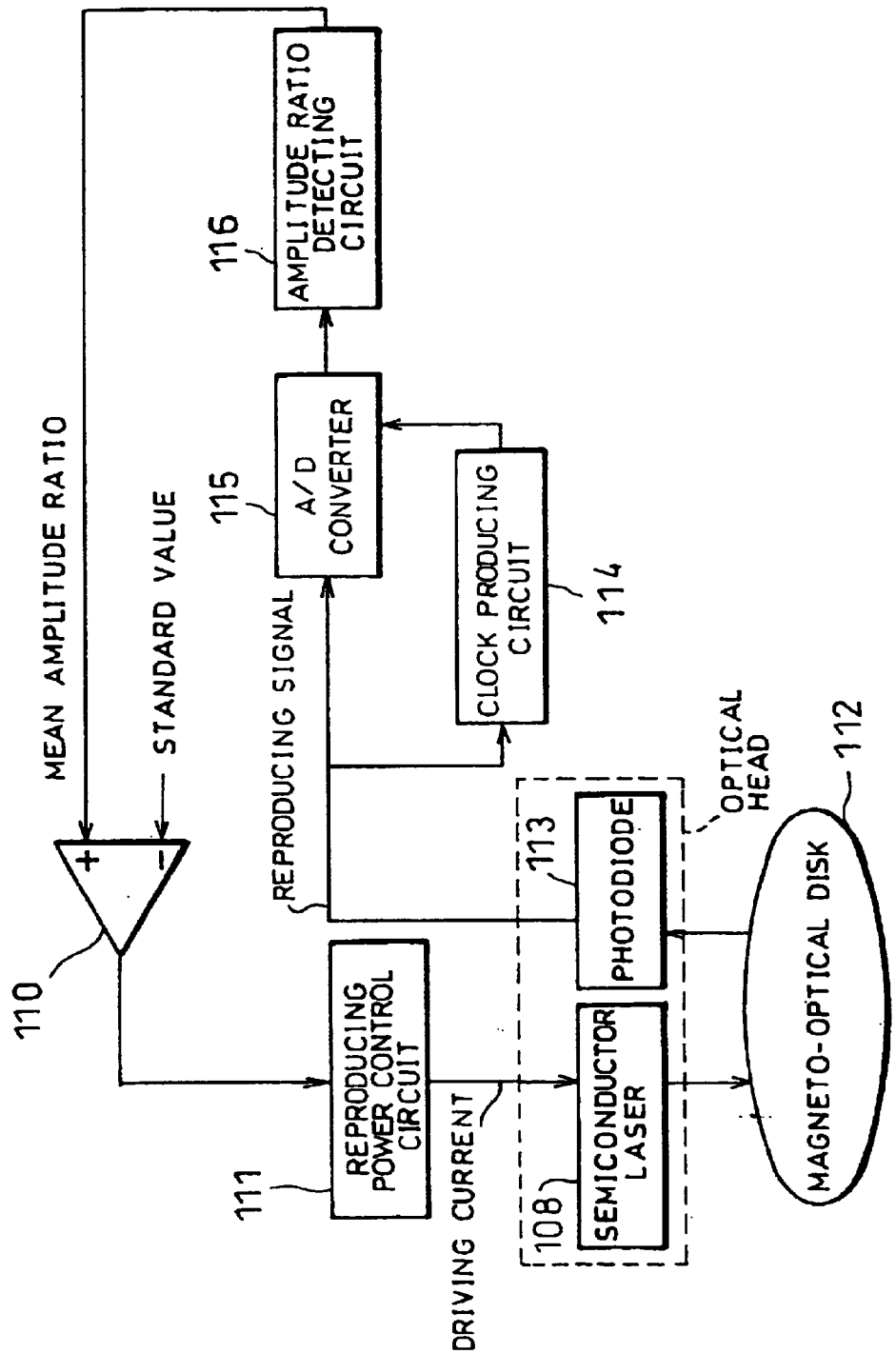
FIG. 30 is an explanatory drawing schematically showing the structure of a conventional optical reproducing device.
Figure 31:
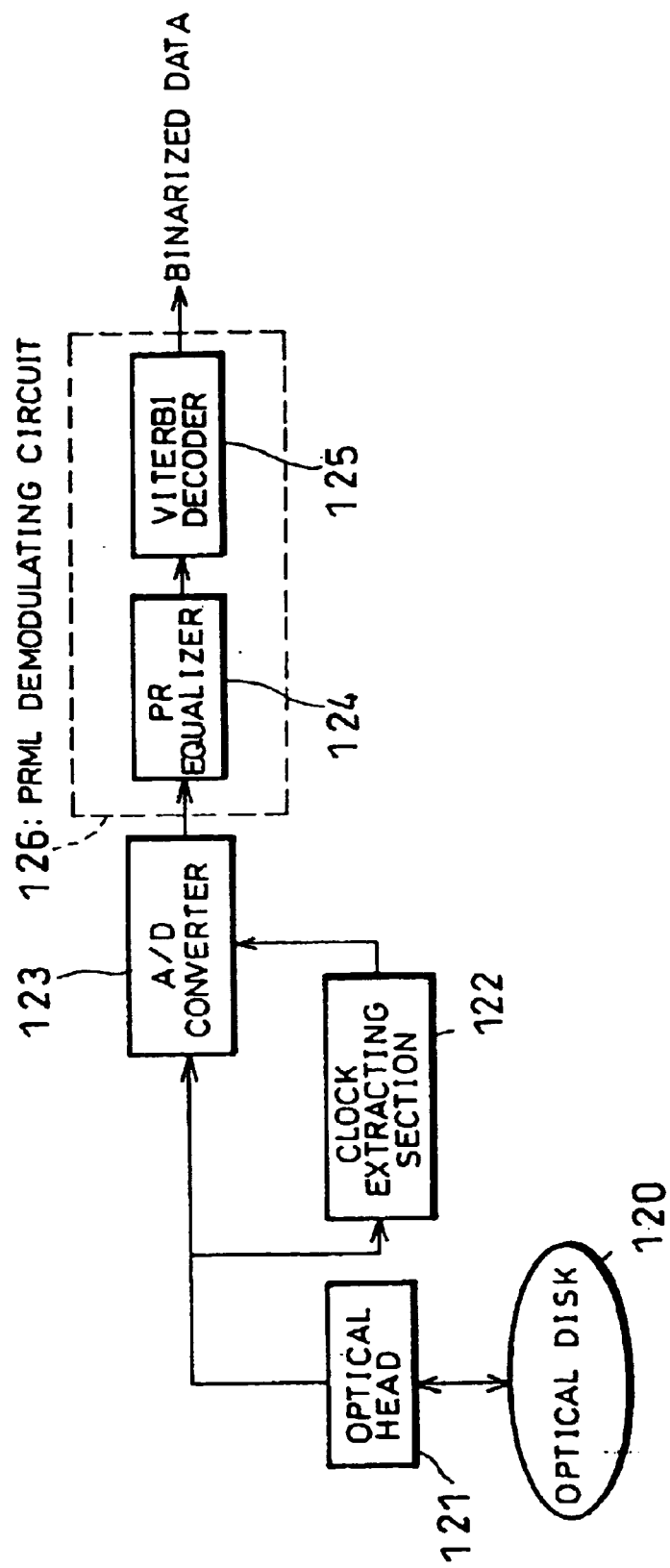
FIG. 31 is an explanatory drawing schematically showing the structure of another conventional optical reproducing device.
Figure 32:
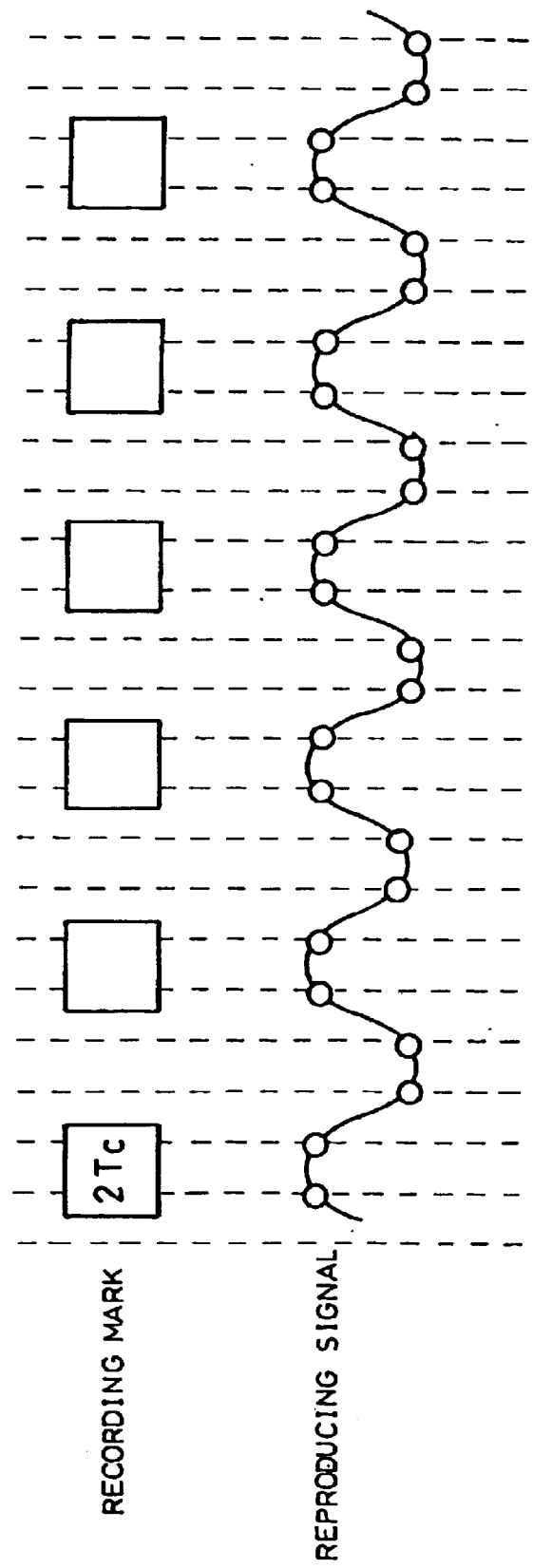
FIG. 32 is an explanatory drawing showing the timing of sampling, suited to PR(1,2,1)ML modulation, of a reproducing signal obtained by reproducing a pattern of repeated recorded marks 2Tc in length using the optical reproducing device shown in FIG. 31.

Next, FIG. 29 is an explanatory drawing explaining the production of digital reproducing signals by the A/D converter 102 when it receives an analog reproducing signal c corresponding to digital data which is a random pattern of recorded marks of various lengths. In this Figure, too, the points sampled by the A/D converter 102 are shown by "○" and "●."

By means of this kind of sampling, the A/D converter 102 produces digital reproducing signals, which are sent to the signal separating circuit 103.

The signal separating circuit 103 assigns each inputted digital reproducing signal alternately to one of two groups of signals. In other words, the signal separating circuit 103 separates the digital reproducing signals shown by "○" in FIG. 29 (hereinafter collectively referred to as the "first digital reproducing signal") from the digital reproducing signals shown by "●" (hereinafter collectively referred to as the "second digital reproducing signal"). The signal separating circuit 103 then sends the first digital reproducing signal to the PRML demodulating circuit 69, and sends both the first digital reproducing signal and the second digital reproducing signal to the amplitude ratio detecting circuit 105.

Upon receiving the first digital reproducing signal, the PRML demodulating circuit 69 equalizes this signal into PR(1,2,1) characteristics, and then decodes it into the most likely data by means of Viterbi decoding, thus producing binarized data. The PRML demodulating circuit 69 then sends this binarized data to the long/short mark extracting circuit 104 and to a binarized data processing device (not shown).

The binarized data sent to the long/short mark extracting circuit 104 corresponds to recorded marks of seven different lengths from 2Tc to 8Tc. The long/short mark extracting circuit 104 extracts from the binarized data the data obtained from recorded marks 8Tc in length, and determines the times at which the samplings which obtained this data were performed (hereinafter referred to as the "first sampling times"). The long/short mark extracting circuit 104 also, in the same way, extracts from the binarized data the data obtained from recorded marks 2Tc in length, and determines the times at which the samplings which obtained this data were performed (hereinafter referred to as the "second sampling times"). The long/short mark extracting circuit 104 then sends a predetermined number of first sampling times and a predetermined number of second sampling times to the amplitude ratio-detecting circuit 105.

The amplitude ratio detecting circuit 105 (reproducing power control section; reproducing power control circuit), based on the first sampling times received from the long/short mark extracting circuit 104, calculates from the first digital reproducing signal a mean amplitude value for the recorded marks 8Tc in length, i.e., the mean amplitude value $(Tl_{mean}-Bl_{mean})$ for the long marks discussed in the second embodiment above. The amplitude ratio detecting circuit 105 also, based on the second sampling times received from the long/short mark extracting circuit 104, calculates from the second digital reproducing signal a mean amplitude value for the recorded marks 2Tc in length, i.e., the mean amplitude value $(Ts_{mean}-Bs_{mean})$ for the short marks discussed in the second embodiment above.

The amplitude ratio detecting circuit 105 then calculates a ratio between these two mean amplitude values, i.e., the mean amplitude ratio $(Ts_{mean}-Bs_{mean})/(Tl_{mean}-Bs_{mean})$ discussed in the second embodiment above, and sends this ratio to the differential amplifier 71.

Calculation of the mean amplitude values and the mean amplitude ratio by the amplitude ratio detecting circuit 105 is performed by the same calculation method as in the amplitude ratio detecting circuit 70 in the second embodiment above. Further, control of the reproducing power of the semiconductor laser 82 by the differential amplifier 71 and the reproducing power control circuit 72 is performed as in the second embodiment above.

As discussed above, in the present reproducing device, the doubled clock producing circuit 101 produces a clock signal CLK3 having a frequency double that of the clock signals CLK1 and CLK2, and the A/D converter 102 produces digital reproducing signals by performing sampling based on this clock signal CLK3. Then the signal separating circuit 103 assigns each digital reproducing signal alternately to one of two digital reproducing signals, which are sent to the amplitude ratio detecting circuit 105 and the PRML demodulating circuit 69. Then the long/short mark extracting circuit 104 identifies the sampling times of the recorded marks (equivalent to the short and long marks), and sends these sampling times to the amplitude ratio detecting circuit 105, which calculates a mean amplitude ratio.

Accordingly, with the present reproducing device, a mean amplitude ratio can be calculated, and the reproducing power of the semiconductor laser 82 controlled, even when reproducing a memory medium which, like the magneto-optical disk 100, is not provided with recording domains for reproducing power control (such as the identification data recording domains 96, short mark recording domains 93, and long mark recording domains 94 of the second embodiment above).

Accordingly, using the present reproducing device, it is possible to reproduce a magneto-optical disk whose efficiency of use, i.e., the proportion of the disk allotted to the data recording domains 95, is higher than that of the magneto-optical disk 61 discussed in the second embodiment above.

In the present embodiment, the modulation method of the digital data in the magneto-optical disk 100 is (1,7)RLL modulation, and the method of PRML demodulation by the PRML demodulating circuit 69 is PR(1,2,1)ML demodulation. However, the digital data modulation method able to be reproduced by the present reproducing device is not limited to (1,7)RLL modulation, and any modulation method may be used. Further, the method of demodulation by the PRML demodulating circuit 69 is not limited to PR(1,2,1)ML demodulation, and any type of PRML demodulation may be used.

In other words, it is sufficient if the doubled clock producing circuit 101 is able to produce a single clock signal corresponding to the optimum clock signal for reproducing the digital data (which is determined by the combination of the modulation method of the digital data and the demodulation method) and the optimum clock signal for reproducing the recorded marks for reproducing power control (which is determined by the type of recorded marks for reproducing power control).

Again, the foregoing embodiment explained reproducing of a magneto-optical disk which uses the magnetic ultra high resolution method, but memory media which can be reproduced by the present reproducing device are not limited to this. The present reproducing device may also be structured so as to be able to reproduce magneto-optical disks which do not use the magnetic ultra high resolution method, optical disks, optical cards, optical tape, etc.

Again, the long/short mark extracting circuit 104 may also be structured so as to extract from the binarized data received from the PRML demodulating circuit 69 only the recorded marks 2Tc and 8Tc in length, and to send to the amplitude ratio detecting circuit 105 the sampling points at the times of extraction of each type of mark.

Again, since the sampling phase which is most suited to the reproducing signal of the recorded marks for reproducing power control differs according to the combination of the modulation method of the digital data, the PRML demodulation method, and the types of recorded marks for reproducing power control, the present reproducing device may be given a structure which is optimum for the reproducing system used.

As discussed above, a fourth optical reproducing device according to the present invention controls the light quantity of a light beam based on a reproducing signal obtained by projecting the light beam onto an optical memory medium in which recorded data and recorded marks are recorded, and is made up of clock producing means, which produce a first sampling clock and a second sampling clock of a phase differing from that of the first sampling clock, for sampling of the reproducing signal; A/D conversion means, which A/D convert the reproducing signal; PRML demodulating means, which demodulate the recorded data which has been A/D converted in accordance with the first sampling clock; signal quantity detecting means, which detect reproducing signal quantity from the recorded marks which have been A/D converted in accordance with the second sampling clock; and light quantity control means, which control the light quantity of the light beam based on the reproducing signal quantity.

With this fourth optical reproducing device, by selecting an optimum sampling phase for A/D conversion according to whether PRML demodulation is being performed or recorded marks for reproducing power control are being detected, a low error rate can be obtained in reproducing data by PRML detecting, and a reproducing signal quantity can be calculated by correctly detecting peak values of the reproducing signal of the recorded marks for reproducing power control. Thus accurate control of reproducing power can be realized.

Further, a fifth optical reproducing device according to the present invention is structured as the fourth optical reproducing device above, in which the clock producing means are separately provided with first PLL means, for producing the first sampling clock, and second PLL means, for producing the second sampling clock.

With this fifth optical reproducing device, by means of a structure which separately provides a PLL for producing the sampling clock for PRML demodulation and a PLL for producing the sampling clock for detecting the amplitude value of the recorded marks for reproducing power control, even if the PLL for PRML demodulation is unable to output a normal clock due to unlocking, etc., this will not influence detecting of the recorded marks for reproducing power control, and thus normal control of reproducing power can be continued.

Further, a sixth optical reproducing device according to the present invention is structured as the fourth optical reproducing device above, and further includes clock selecting means, which switch to the first sampling clock when performing PRML demodulation and to the second sampling clock when performing light quantity control, and which output the selected sampling clock to the A/D conversion means.

With this sixth optical reproducing device, by changing the sampling timing for A/D conversion by switching between the two clocks of different phase, a single A/D converter can be used both for PRML demodulation and for detecting recorded marks for reproducing power control. Thus the structure of the reproducing device can be streamlined.

Further, a seventh optical reproducing device according to the present invention is structured as the sixth optical reproducing device above, and further includes identification data reproducing means for reproducing identification data for identifying the clock needed in PRML demodulation and the clock needed in light quantity control; in which the clock selecting means are switched based on the identification data.

Further, a fourth optical memory medium according to the present invention is an optical memory medium provided with a reproducing layer and a recording layer, from which data recorded in the recording layer is reproduced by forming on the reproducing layer an aperture smaller in diameter than the spot of a light beam projected thereon, and is provided with identification data recording domains in which are recorded identification data for identifying a difference in phase between a clock for detecting reproducing signal quantity, which is used for controlling the light quantity of the light beam, and a clock for reproducing data.

With the seventh optical reproducing device and the fourth optical memory medium, identification data regarding the modulation method, the types of recorded marks for reproducing power control, etc. is recorded in identification data recording domains in the magneto-optical disk, and the clock for A/D conversion is selected on the basis of the identification data distinguished by the identification data reproducing means. This structure enables setting of an optimum sampling phase for A/D conversion of recording marks for reproducing power control, which can vary according to the combination of the PRML method, the modulation method of the recorded data, and the types of recorded marks for reproducing power control. Thus accurate control of reproducing power can be realized.

Further, an eighth optical reproducing device according to the present invention controls the light quantity of a light beam based on a reproducing signal obtained by projecting the light beam onto an optical memory medium in which recorded data and recorded marks are recorded, and is made up of doubled clock producing means, which produce a sampling clock with a frequency double that of a reproducing clock of the reproducing signal; A/D converting means, which A/D convert the reproducing signal using the sampling clock; separating means, which assign the A/D converted output signals during each sampling clock alternately to one of two signals, and output these two signals; PRML demodulating means, which receive and demodulate one of the two signals separated by the separating means; signal quantity detecting means, which receive and detect a reproducing signal quantity from the other of the two signals separated by the separating means; and light quantity control means, which control the light quantity of the light beam based on the reproducing signal quantity.

With the eighth optical reproducing device, by means of a structure in which, using a sampling clock having a frequency double the reproducing bit frequency, A/D converted reproducing signals during each sampling clock are alternately assigned to one of two signals, amplitude values of shortest marks and longest marks can be detected from among the recorded data, which includes marks of various lengths. Consequently, recorded marks for reproducing power control are unnecessary, and the efficiency of use of the magneto-optical disk can be increased.

Further, a ninth optical reproducing device according to the present invention is made up of a reproducing signal production section, which projects a light beam onto an optical memory medium, and, based on reflected light of the light beam, produces a reproducing signal corresponding to recorded marks recorded in the optical memory medium; a control signal output section, which detects a mean value of a signal quantity of the reproducing signal produced by the reproducing signal production section, and produces a first control signal corresponding to the mean value; and a reproducing power control section, which, based on the first control signal produced by the control signal output section, controls reproducing power of the light beam projected by the reproducing signal production section such that the signal quantity of the reproducing signal is an optimum value.

Further, a tenth optical reproducing device according to the present invention is structured as the ninth optical reproducing device above, in which the control signal output section is made up of a peak value detecting section, which detects a predetermined number of maximal and minimal values of a reproducing signal corresponding to the recorded marks of the optical memory medium; a mean value producing section, which, from the predetermined number of maximal and minimal values detected by the peak value detecting section, produces a mean value of the amplitude value of the reproducing signal; and a control signal producing section, which, based on the mean value produced by the mean value producing section, produces a first control signal.

Further, an eleventh optical reproducing device according to the present invention is structured as the tenth optical reproducing device above, in which the peak value detecting section detects a predetermined quantity of maximal and minimal values of a reproducing signal corresponding to first recorded marks of a predetermined mark length, and a predetermined quantity of maximal and minimal values of a reproducing signal corresponding to second recorded marks of a mark length differing from that of the first recorded marks; and the mean value producing section is made up of a first mean value calculating section, which, based on the maximal and minimal values of the reproducing signal corresponding to the first recorded marks, calculates a mean value of an amplitude thereof, and a second mean value calculating section, which, based on the maximal and minimal values of the reproducing signal corresponding to the second recorded marks, calculates a mean value of an amplitude thereof; and the control signal producing section produces the first control signal by finding a ratio between the mean value calculated by the first mean value calculating section and the mean value calculated by the second mean value calculating section.

Further, a twelfth optical reproducing device according to the present invention is structured as the eleventh optical reproducing device above, in which each of the first and second mean value calculating sections, includes a shift register for storing the predetermined quantity of maximal and minimal values of the reproducing signal corresponding to the first or second recorded marks detected by the peak value detecting section; a first addition circuit for calculating a sum of all of the maximal values stored in the shift register; a second addition circuit for calculating a sum of all of the minimal values stored in the shift register; a first division circuit for calculating a mean value for the maximal values by dividing the sum of the maximal values calculated by the first addition circuit by the predetermined quantity; a second division circuit for calculating a mean value for the minimal values by dividing the sum of the minimal values calculated by the second addition circuit by the predetermined quantity; and a first subtraction circuit for calculating a mean value of the amplitude of the reproducing signal corresponding to the first recorded marks or to the second recorded marks by subtracting the mean value for the minimal values calculated by the second division circuit from the mean value for the maximal values calculated by the first division circuit.

Further, a thirteenth optical reproducing device according to the present invention is structured as the ninth optical reproducing device above, in which the reproducing power control section is made up of a differential amplifier, to which is inputted the first control signal and a predetermined standard value, and which produces a second control signal which is a result of comparison between the first control signal and the standard value; and a reproducing power adjusting section, which controls the reproducing power such that the value of the second control signal is reduced; and the second control signal is produced such that a BER of the reproducing signal produced by the reproducing signal production section is 1E-4 or less.

Further, a fifth optical memory medium according to the present invention is made up of a recording layer for recording data, and a reproducing layer, laminated on the recording layer, on which an aperture is formed by projection of a predetermined light beam, from which aperture the data recorded on the recording layer is read; in which the recording layer includes data recording domains in which are formed recorded marks for recording of ordinary data, and reproducing power control domains, in which are formed 5 bytes or more and 40 bytes or less of recorded marks for reproducing power control, for controlling reproducing power of the light beam.

Further, a sixth optical memory medium according to the present invention is structured as the fifth optical memory medium above, in which each reproducing power control domain includes a domain in which are formed 5 bytes or more and 40 bytes or less of first recorded marks of a predetermined mark length; and a domain in which are formed 5 bytes or more and 40 bytes or less of second recorded marks of a mark length differing from that of the first recorded marks.

Further, a seventh optical memory medium according to the present invention is structured as the fifth optical memory medium above, in which the reproducing power control domains are provided in each sector formed on the recording layer.

Further, an eighth optical memory medium according to the present invention is made up of a recording layer for recording data, and a reproducing layer, laminated on the recording layer, on which an aperture is formed by projection of a predetermined light beam, from which aperture the data recorded on said recording layer is read; in which the recording layer includes a data recording domain, in which are formed recorded marks for recording of ordinary data, a reproducing power control domain, in which are formed recorded marks for reproducing power control, for controlling reproducing power of the light beam, and a disk information domain, in which are recorded the modulation method of the recorded marks in the data recording domain and the reproducing power control domain, and the state of recording of the recorded marks for reproducing power control.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claim is:

1. An optical memory medium comprising a recording layer for recording data, and a reproducing layer, laminated on said recording layer, on which an aperture is formed by projection of a predetermined light beam, from which aperture the data recorded on said recording layer is read, wherein:

a track for recording of data includes a reproducing power control domain of 5 bytes or more and 40 bytes or less, for recording of recorded marks for reproducing power control, for controlling reproducing power of the light beam.

2. The optical memory medium set forth in claim 1, wherein said reproducing power control domain includes:

a domain of 5 bytes or more and 40 bytes or less, for recording of first recorded marks of a predetermined mark length; and a domain of 5 bytes or more and 40 bytes or less, for recording of second recorded marks of a mark length differing from that of the first recorded marks.

3. The optical memory medium set forth in claim 1, wherein:

a said reproducing power control domain is provided in each sector formed on said track.

4. An optical memory medium comprising a recording layer for recording data, and a reproducing layer, laminated on said recording layer, on which an aperture is formed by projection of a predetermined light beam, from which aperture the data recorded on said recording layer is read, wherein:

on a track for recording of data are provided:

a data recording domain, for recording of ordinary data;

a reproducing power control domain, for recording of recorded marks for reproducing power control, for controlling reproducing power of the light beam; and a disk information domain, for recording of the modulation method of the recorded marks in said data recording domain and said reproducing power control domain, and the state of recording of the recorded marks for reproducing power control.

* * * * *